US009387835B2

(12) United States Patent
Pelletier

(10) Patent No.: US 9,387,835 B2
(45) Date of Patent: Jul. 12, 2016

(54) PEDAL APPARATUS FOR A VEHICLE

(71) Applicant: Kongsberg Power Product Systems I, Inc., Willis, TX (US)

(72) Inventor: Jon Pelletier, Conroe, TX (US)

(73) Assignee: KONGSBERG POWER PRODUCTS SYSTEMS I, INC., Willis, TX (US)

( * ) Notice: Subject to any disclaimer, the term of this patent is extended or adjusted under 35 U.S.C. 154(b) by 5 days.

(21) Appl. No.: 14/421,713

(22) PCT Filed: Aug. 14, 2013

(86) PCT No.: PCT/US2013/054997
§ 371 (c)(1),
(2) Date: Feb. 13, 2015

(87) PCT Pub. No.: WO2014/028651
PCT Pub. Date: Feb. 20, 2014

(65) Prior Publication Data
US 2015/0232071 A1     Aug. 20, 2015

Related U.S. Application Data

(60) Provisional application No. 61/742,584, filed on Aug. 14, 2012.

(51) Int. Cl.
*G05G 1/44*     (2008.04)
*B60T 7/04*     (2006.01)
(Continued)

(52) U.S. Cl.
CPC . *B60T 7/045* (2013.01); *G05G 1/44* (2013.01); *G05G 5/06* (2013.01); *B60K 41/20* (2013.01); *Y10T 477/84* (2015.01); *Y10T 477/893* (2015.01); *Y10T 477/8936* (2015.01)

(58) Field of Classification Search
CPC .............. Y10T 477/84; Y10T 477/893; Y10T 477/8936; B60K 41/20; B60T 7/045; G05G 5/06; G05G 1/44
USPC ........................................ 74/478, 471 R, 529
See application file for complete search history.

(56) References Cited

U.S. PATENT DOCUMENTS 6,138,802 A    10/2000   McFarlane et al.
6,151,984 A    11/2000   Johansson et al.
(Continued)

FOREIGN PATENT DOCUMENTS

DE      197 26 188 A1    1/1998
EP       1 588 226 B1    10/2005
(Continued)

OTHER PUBLICATIONS
International Search Report for Application No. PCT/US2013/054997 dated Oct. 24, 2013, 2 pages.
(Continued)

*Primary Examiner* — Roger Pang
(74) *Attorney, Agent, or Firm* — Howard & Howard Attorneys PLLC

(57) ABSTRACT

A pedal apparatus for a vehicle. The pedal apparatus includes a support defining an axis. The pedal apparatus further includes a brake pedal assembly movable about the axis between a first position and a second position. The brake pedal assembly includes a latch movable between unlocked and locked positions. The pedal apparatus includes an accelerator pedal assembly movable about the axis between initial and displaced positions. The pedal apparatus includes an intermediate device disposed about the axis and having a plurality of first and second teeth. The latch is engageable with the first teeth when in the locked position. The braking apparatus further includes a retainer disposed about the axis. The retainer has a hub mounted to the support and at least one actuating device selectively engaging at least one of the second teeth of the intermediate device to couple the intermediate device to the retainer and the support.

21 Claims, 25 Drawing Sheets

(51) Int. Cl.
*G05G 5/06* (2006.01)
*B60W 10/04* (2006.01)

(56) References Cited

U.S. PATENT DOCUMENTS

| | | | |
|---|---|---|---|
| 6,173,625 B1 | 1/2001 | McFarlane et al. | |
| 6,223,865 B1 | 5/2001 | Lang et al. | |
| 6,295,890 B2 | 10/2001 | Rixon et al. | |
| 6,298,745 B1 | 10/2001 | Rixon et al. | |
| 6,298,748 B1 | 10/2001 | Rixon et al. | |
| 6,415,681 B1 * | 7/2002 | Porter | G05G 1/305 192/13 R |
| 6,629,472 B2 | 10/2003 | Scheidling et al. | |
| 6,662,677 B2 | 12/2003 | Rixon et al. | |
| 6,698,309 B2 | 3/2004 | Rixon et al. | |
| 6,918,316 B2 | 7/2005 | Johansson et al. | |
| 8,205,523 B2 | 6/2012 | Stewart et al. | |
| 2002/0189909 A1 | 12/2002 | Buckley et al. | |
| 2005/0016320 A1 | 1/2005 | Porter | |
| 2011/0023652 A1 | 2/2011 | Cosby et al. | |

FOREIGN PATENT DOCUMENTS

| | | |
|---|---|---|
| JP | S59 134035 A1 | 8/1984 |
| JP | S63 121556 A1 | 5/1988 |
| SE | 526594 C2 | 10/2005 |

OTHER PUBLICATIONS

Machine-assisted English language translation for DE 197 26 188 extracted from espacenet.com database on Aug. 12, 2015, 12 pages.
English language abstract of JPS63121556 A extracted from espacenet.com database on Aug. 13, 2015, 11 pages.
English language abstract of JPS59134035 A extracted from espacenet.com database on Aug. 13, 2015, 6 pages.
English language abstract and machine-assisted English language translation for SE 526594 extracted from espace.com database on Nov. 23, 2015, 15 pages.

* cited by examiner

PEDAL APPARATUS FOR A VEHICLE

This application is the National Stage of International Patent Application No. PCT/US 2013/054997, filed on Aug. 14, 2013, which claims priority to and all advantages of U.S. Provisional Patent Application No. 61/742,584, which was filed on Aug. 14, 2012, the disclosure of which is specifically incorporated by reference.

BACKGROUND OF THE INVENTION

1. Field of the Invention

The subject invention relates to a pedal assembly for a vehicle.

2. Description of Related Art

Pedal assemblies are used with vehicles to provide varying inputs to different systems within the vehicle. Typically, the pedal assembly includes an accelerator pedal for operating an engine or motor and a brake pedal for operating a brake system for slowing and/or stopping the vehicle. In certain vehicles, it is desirable to maintain the operation of the brake system by locking the brake pedal in a depressed position to keep the vehicle in a parked state. It is further desirable to unlock the brake pedal from the depressed position by depressing the accelerator pedal or further depressing the brake pedal. One solution for maintaining the operation of the brake system involves the pedal assembly having first gear and a second gear coupled to one another. The first and second gears are rotatable and have opposing configurations. The brake pedal has a hook that pivots to selectively engage the first gear. The accelerator pedal has an arm that pivots to selectively engage the second gear. The opposing configuration of the first and second gears puts the latch and the arm in tension when both engage their respective gears for retaining the brake pedal in the depressed position.

The rotation of the gears, the pivoting of the latch, and the pivoting of the arm do not occur along a common axis. Instead, the gears, latch, and arm are spaced from one another on varying axes. As such, the volume within the vehicle that is needed to fit the components of the pedal assembly is increased. Therefore, there remains an opportunity to develop an improved pedal assembly for a vehicle.

SUMMARY OF THE INVENTION AND ADVANTAGES

The subject invention provides for a pedal apparatus for a vehicle. The vehicle includes a prime mover and a braking mechanism. The pedal apparatus includes a support defining an axis. The pedal apparatus further includes a brake pedal assembly movable about the axis between a first position and a second position for operating the braking mechanism. The brake pedal assembly includes a latch movable between unlocked and locked positions independent of the movement of the brake pedal assembly between the first and second positions. The pedal apparatus further includes an accelerator pedal assembly movable about the axis between an initial position and a displaced position for operating the prime mover. The pedal apparatus includes an intermediate device disposed about the axis and having a plurality of first and second teeth. The latch is engageable with at least one of the first teeth when in the locked position to couple the brake pedal assembly to the intermediate device. The braking apparatus further includes a retainer disposed about the axis. The retainer has a hub mounted to the support and at least one actuating device selectively engaging at least one of the second teeth of the intermediate device to couple the intermediate device to the retainer and the support for retaining the latch in the locked position and the brake pedal assembly in the second position.

The subject invention further provides for the pedal apparatus for the vehicle with the vehicle having the prime mover and the braking mechanism, as described above. The pedal apparatus includes the shaft defining the axis. The pedal apparatus includes the brake pedal assembly movable about the axis between the first position and the second position for operating the braking mechanism. The brake pedal assembly has a locked condition preventing movement out of the second position for continuously actuating the braking mechanism. The pedal apparatus includes the accelerator pedal assembly movable about the axis between the initial position and the displaced position for operating the prime mover. The pedal apparatus includes the intermediate device disposed about the axis with the brake pedal assembly engaging the intermediate device when in the locked condition. The pedal apparatus further includes the retainer disposed about the shaft and the axis with the intermediate device concentrically disposed about at least a portion of the retainer. The retainer has at least one actuating device selectively engaging the intermediate device to couple the intermediate device to the retainer for retaining the brake pedal assembly in the locked condition.

Accordingly, the pedal apparatus is capable of being suspended within the vehicle. Suspending the pedal apparatus prevents intrusion of contaminants, such as dirt and grass, from entering the pedal apparatus. Furthermore, the pedal apparatus has a compact design with the brake pedal assembly, the accelerator pedal assembly, intermediate device, and the retainer disposed about the axis.

BRIEF DESCRIPTION OF THE DRAWINGS

Advantages of the subject invention will be readily appreciated as the same becomes better understood by reference to the following detailed description when considered in connection with the accompanying drawings.

DETAILED DESCRIPTION OF THE INVENTION

Figure 1:
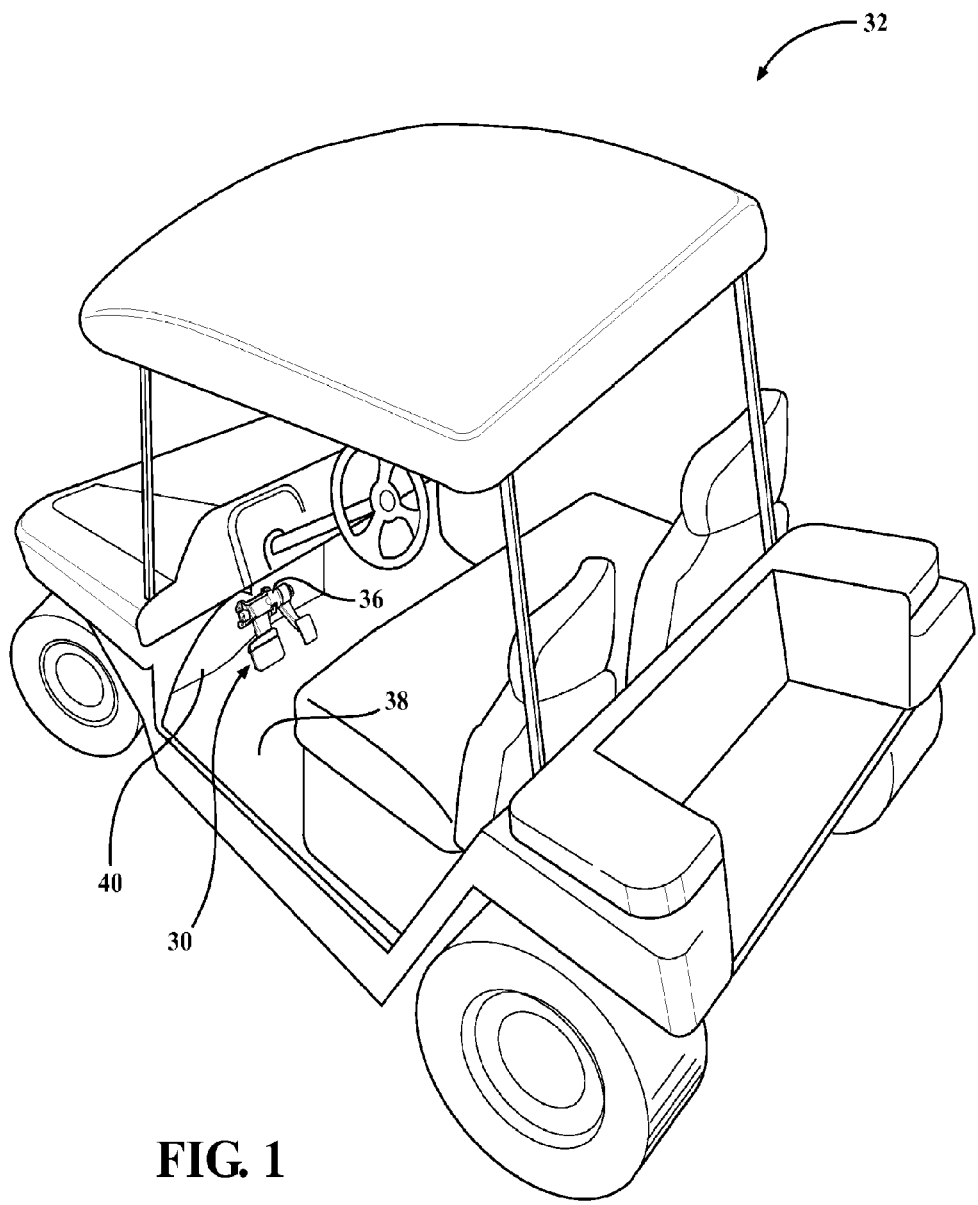
FIG. 1 is a perspective view of a vehicle including a pedal apparatus in accordance with the subject invention.

Referring to the Figures, wherein like numerals indicate like or corresponding parts throughout the several views, a pedal apparatus 30 for a vehicle 32 is generally shown in FIG. 1. The vehicle 32 is typically a small utility vehicle, such as a golf cart, for transporting a user. It is to be appreciated that the vehicle 32 may be any vehicle for transporting the user.

The vehicle 32 includes a prime mover and a braking mechanism. The prime mover generates power to move the vehicle 32. The prime mover can be an engine, a motor, gas or electric or any other device for propelling the vehicle 32. The braking mechanism, when activated, slows and/or stops the vehicle 32. The braking mechanism may be a disc brake or a drum brake (as are known in art), or may be any other device for slowing and/or stopping the vehicle 32. In one embodiment, the braking mechanism further serves the purpose of maintaining the vehicle 32 in the stopped state, which is known as a parked state. Said differently, the braking mechanism prevents unwanted movement of the vehicle 32.

The pedal apparatus 30 includes a braking apparatus 34 for operating the braking mechanism of the vehicle 32, as shown in FIGS. 2-6 and 15-17. As will be described below, the braking apparatus 34 may operate the braking mechanism by any suitable means, such as electronic actuation and cable actuation. The pedal apparatus 30 (more specifically, the braking apparatus 34) also selectively maintains the activation of the braking mechanism to maintain the vehicle 32 in the parked state.

The pedal apparatus 30 includes a support 36 defining an axis A, as shown in FIGS. 2-5, 15, and 16. As shown in FIG. 1, the support 36 is mounted to the vehicle 32 by fasteners, welding, or any other suitable means. Said differently, the pedal apparatus 30 is mounted to the vehicle 32 through the support 36. The vehicle 32 defines a floor 38 and a wall 40 adjacent to the floor 38. The support 36 is mounted to the wall 40, spaced from the floor 38. Such a configuration is usually referred to as suspending the pedal apparatus 30. Suspending the pedal apparatus 30 is advantageous in that contaminants, such as dirt and grass, which usually accumulate on the floor 38, are less likely to enter the pedal apparatus 30 suspended on the wall 40 above the floor 38. It is to be appreciated that the pedal apparatus 30 may be mounted to the floor 38 or in any other suitable configuration.

Figure 4:
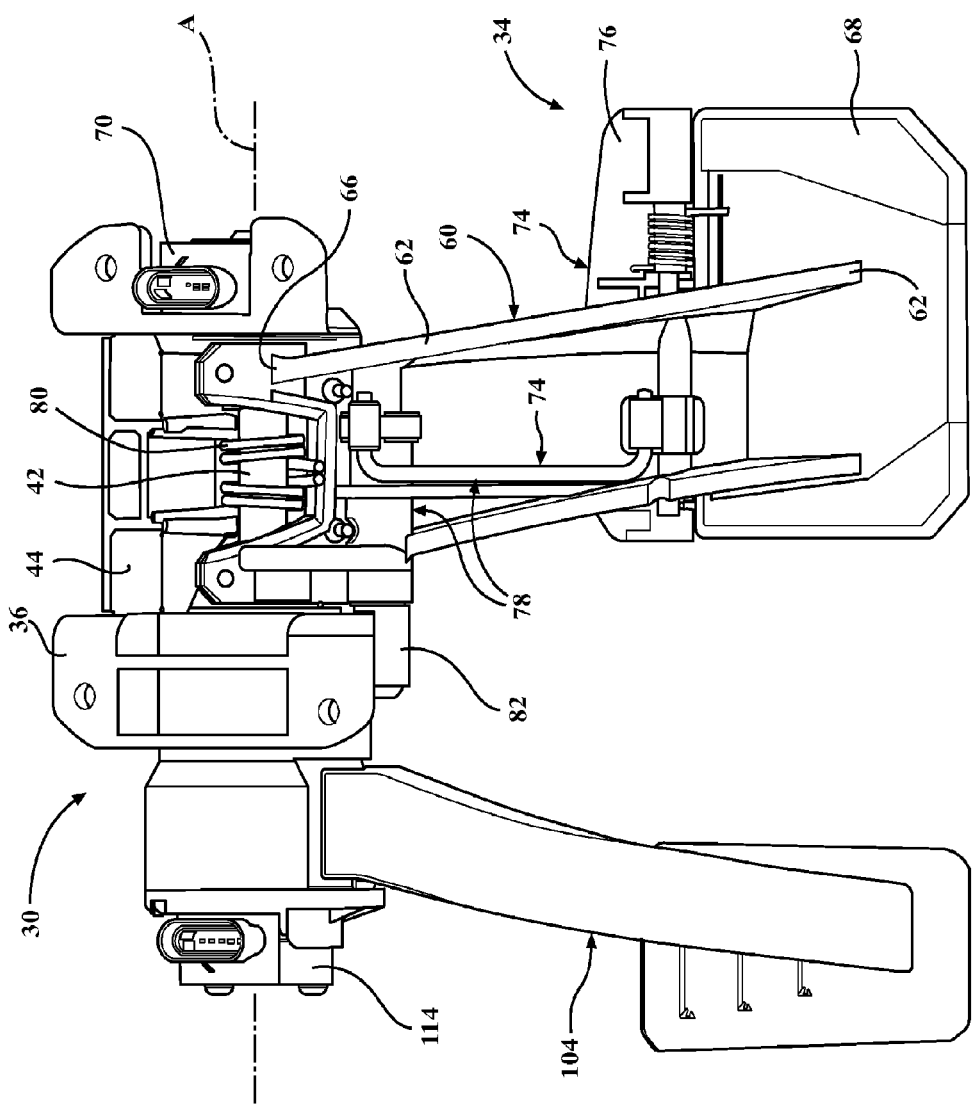
FIG. 4 is a rear elevational view of the pedal apparatus of FIG. 1.

As shown in FIGS. 4, 5, 15, and 16, the pedal apparatus 30 may further include a shaft 42. More specifically, the braking apparatus 34 includes the shaft 42, with the shaft 42 defining the axis A. The shaft 42 extends through the support 36 along the axis A. More specifically, the support 36 defines an interior 44 with the shaft 42 extending through the interior 44 longitudinally along the support 36, as shown in FIG. 4. The shaft 42 extends to a first and second shaft ends opposite one another. The shaft 42 is coupled to support 36 at each of the first and second shaft ends and is rotatable about the axis A relative to the support 36.

Figure 5:
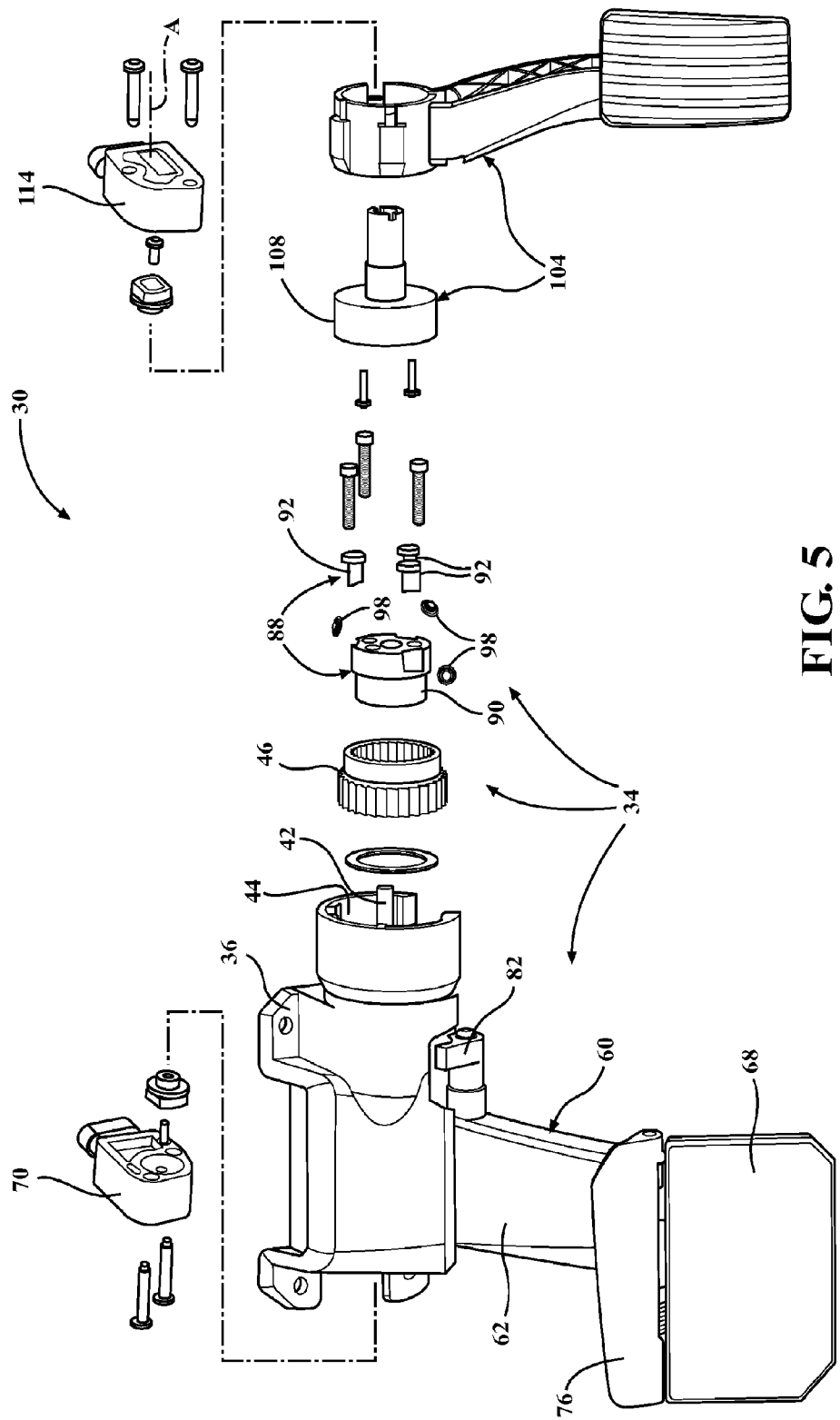
FIG. 5 is an exploded view of a first embodiment of the pedal apparatus.
Figure 6:
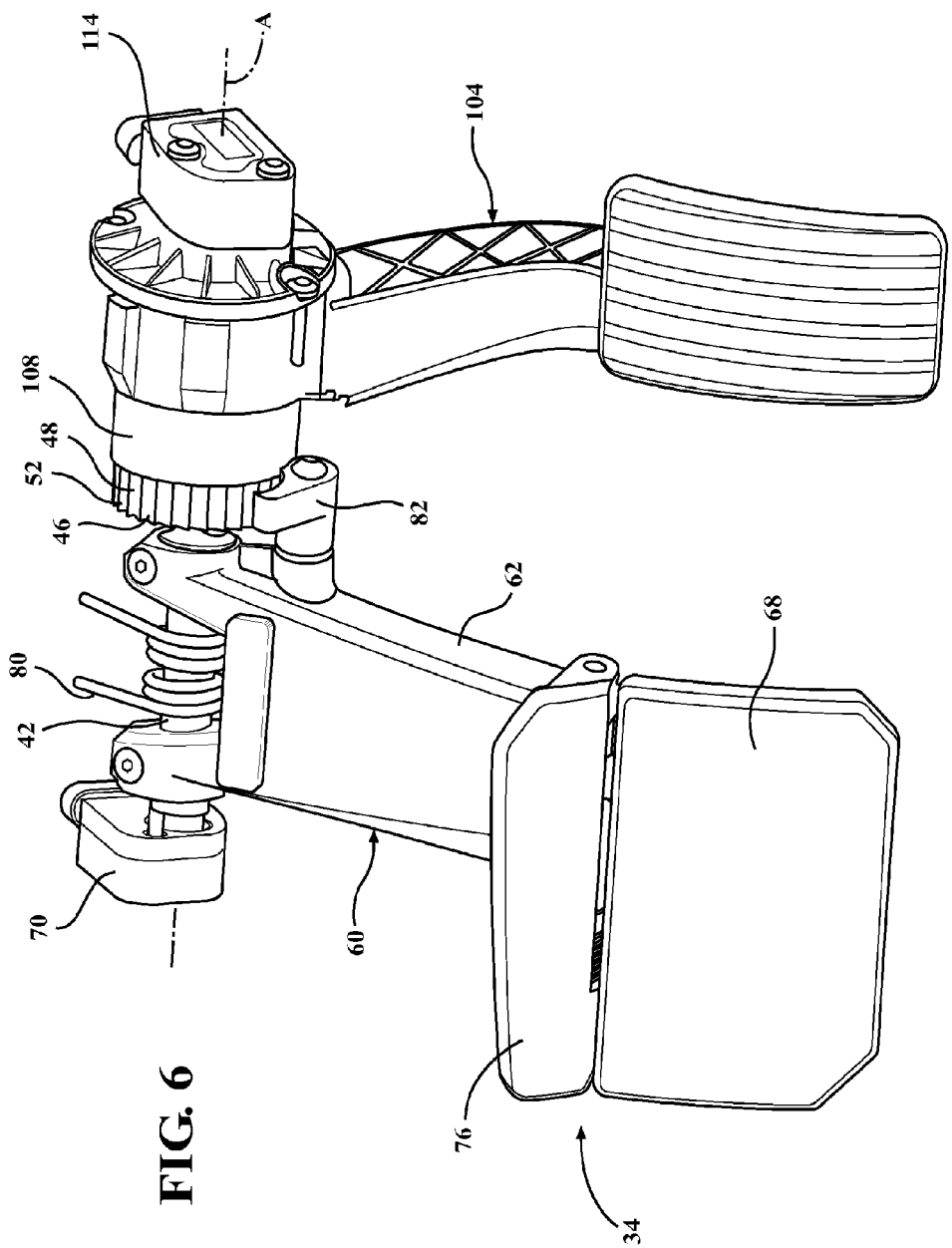
FIG. 6 is a perspective view of the pedal apparatus of FIG. 5 with a support being removed.
Figure 8:
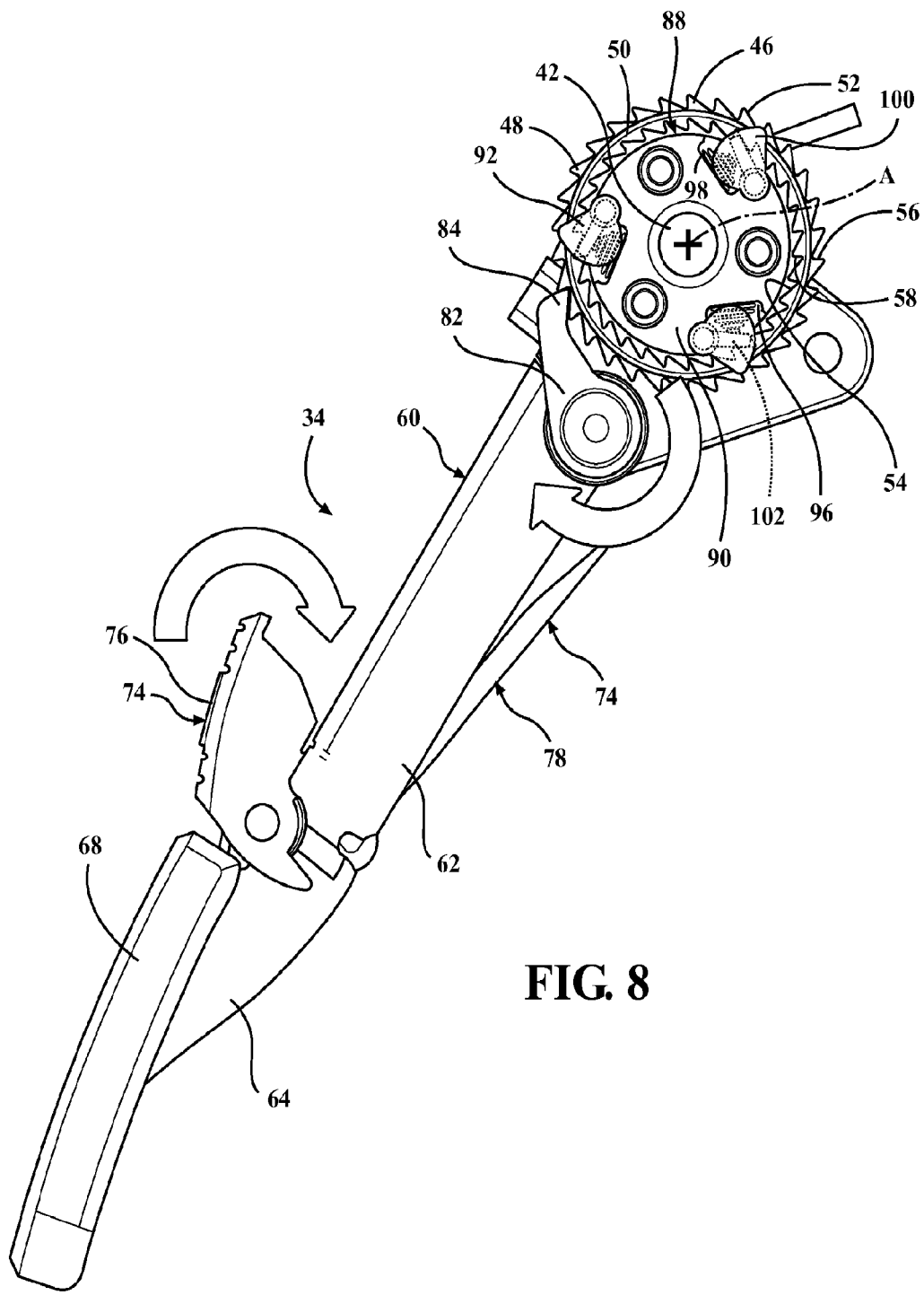
FIG. 8 is a side elevational view of a brake pedal assembly of the pedal apparatus of FIG. 5 having a latch with the brake pedal assembly in a second position, the latch engaging an intermediate device in a locked position, and a retainer engaging the intermediate device.

As shown in FIGS. 5 and 8, the pedal apparatus 30 includes an intermediate device 46 disposed about the axis A. More specifically, the braking apparatus 34 includes the intermediate device 46. The intermediate device 46 has a plurality of first and second teeth 48, 50, as shown in FIG. 8.

The intermediate device 46 may have an annular configuration with the intermediate device 46 concentrically disposed about the axis A. However, it is to be appreciated that the intermediate device 46 may have any configuration disposed about the axis A. The intermediate device 46 is capable of rotating about the axis A.

The intermediate device 46 may have an external surface 52 substantially facing the support 36 and an internal surface 54 substantially facing the shaft 42. Said differently, the external surface 52 of the annularly configured intermediate device 46 is disposed proximate the support 36 while the internal surface 54 of the annularly configured intermediate device 46 is disposed proximate the shaft 42.

Figure 14:
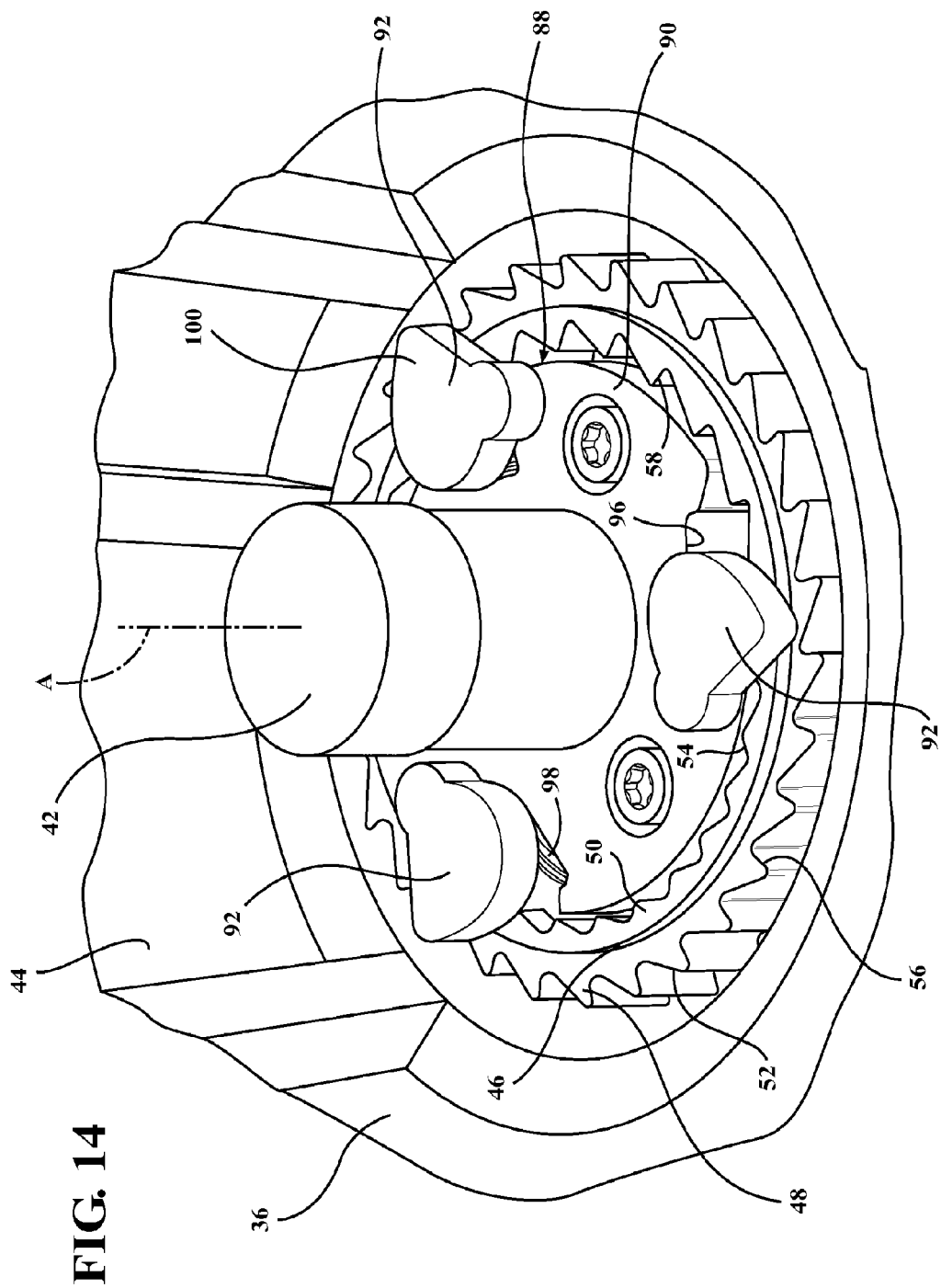
FIG. 14 is a fragmented perspective view of the retainer, the intermediate device, and the support of FIG. 5.

In one embodiment, the first teeth 48 are disposed along the external surface 52 and extend toward the support 36, and the second teeth 50 are disposed along the internal surface 54 and extend toward the shaft 42, as shown in FIG. 14. The first and second teeth 48, 50 of the intermediate device 46 may have opposing configurations, as shown in FIG. 8. More specifically, the first teeth 48 extends generally radial away from the axis A. Furthermore, the first teeth 48 are angled away from the general radial configuration. The second teeth 50 also extend generally radial toward the axis A. The second teeth 50 are also angled away from the general radial configuration. However, the second teeth 50 are angled opposite the first teeth 48. Said differently, the angle of the first and second teeth 48, 50 from the generally radial configuration is opposite one another.

Each of the first teeth 48 includes an engagement surface 56. The engagement surface 56 is angled inward such that the engagement surface 56 at least partially faces the axis A. Each of the second teeth 50 includes a contact surface 58. The contact surface 58 is disposed substantially radial to the axis A. Each radially adjacent engagement surface 56 and contact surface 58 are disposed substantially facing away from each other.

Figure 17:
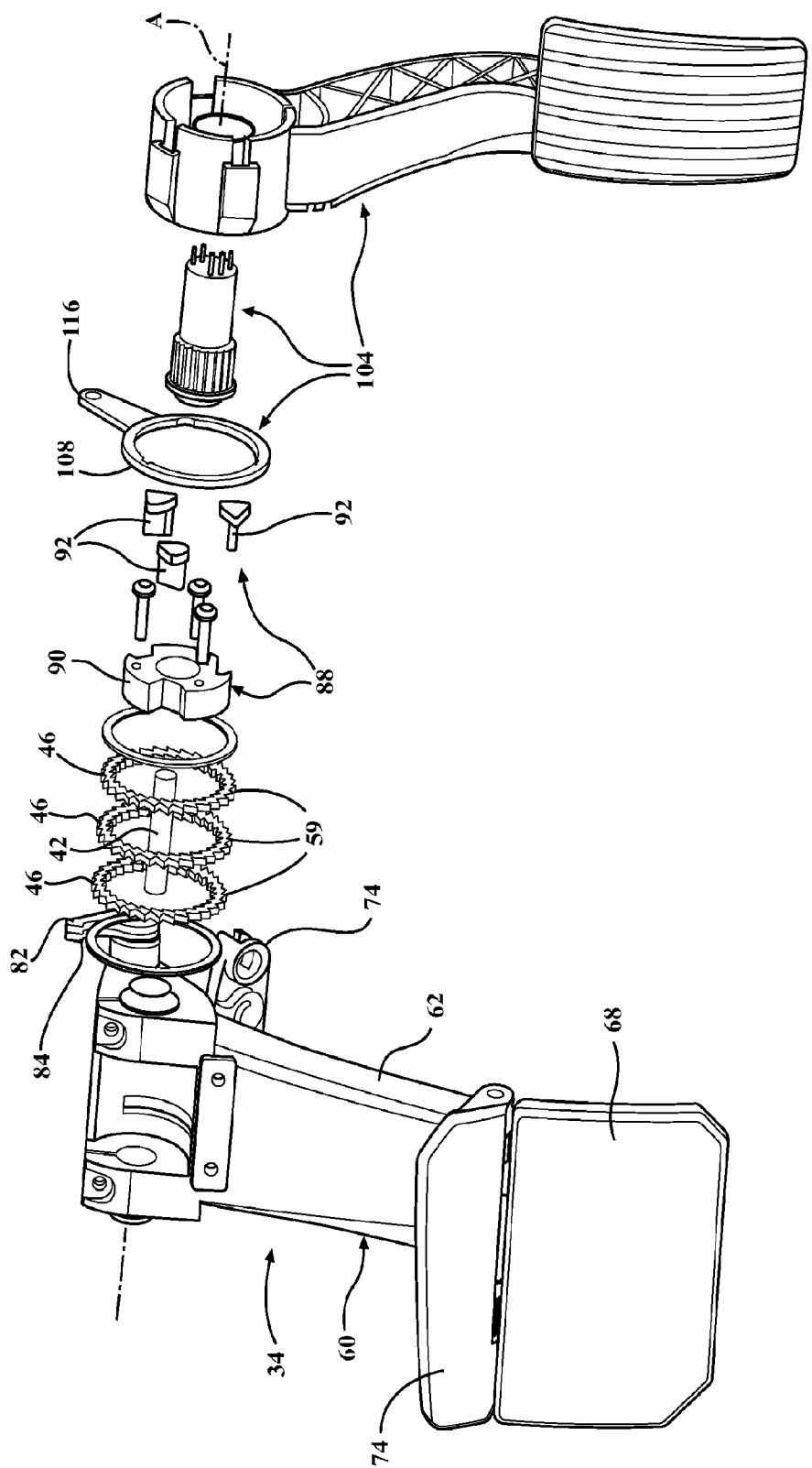
FIG. 17 is an exploded view of the pedal apparatus of FIG. 15.

The intermediate device 46 may be a unitary component as shown in FIG. 5, or may include a plurality of plates 59 stacked upon one another, as shown in FIG. 17. Each plate is identically configured and has the first and second teeth 48, 50. The stacking of the plates 59 extends the intermediate device 46 longitudinally along the axis A.

Figure 11:
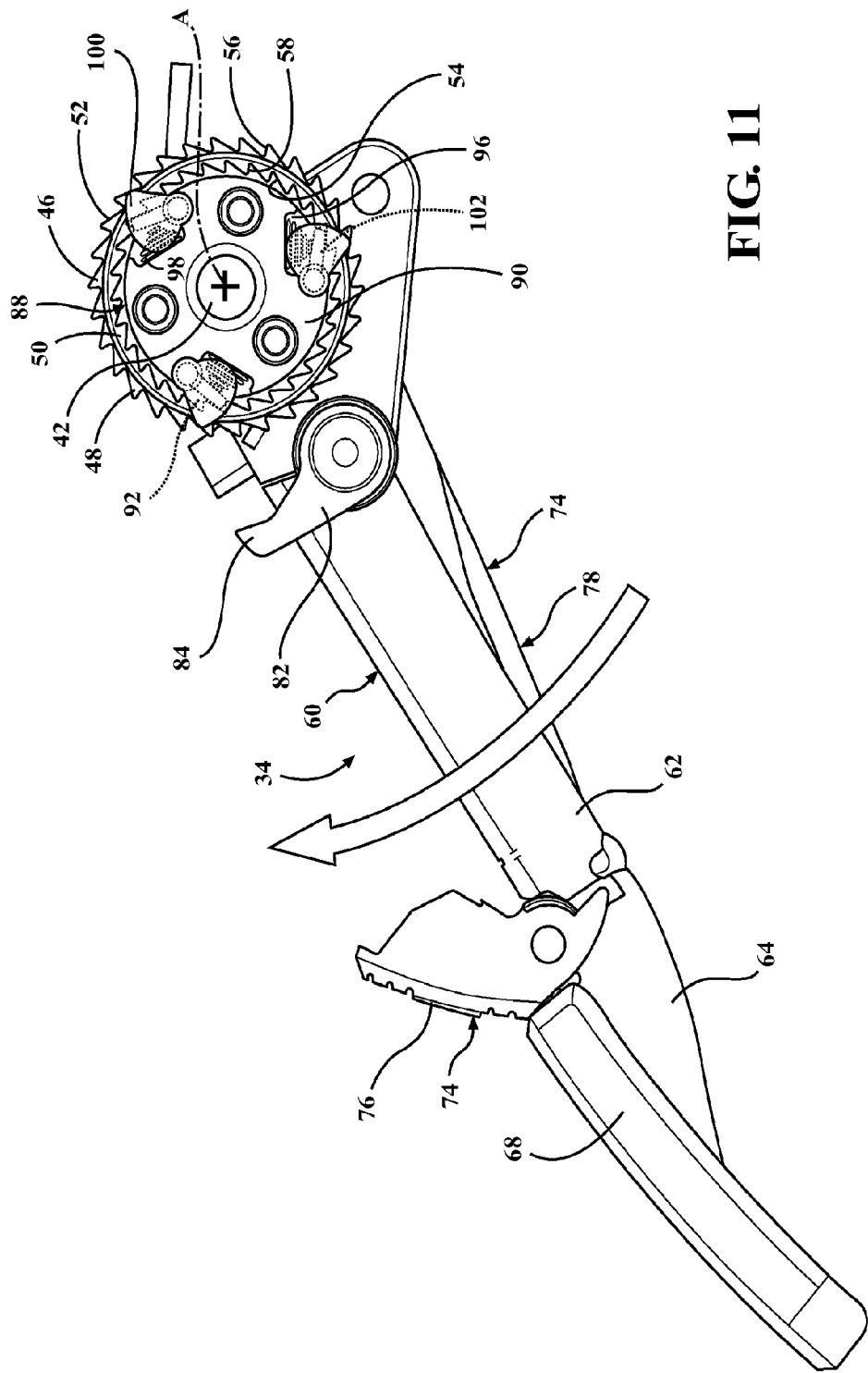
FIG. 11 is a side elevational view of the brake pedal assembly of the pedal apparatus of FIG. 5 with the brake pedal assembly in a first position, the latch in the unlocked position and disengaged from the intermediate device, and the retainer engaging the intermediate device.

The pedal apparatus 30 includes a brake pedal assembly 60 movable about the axis A between a first position, as shown in FIG. 11, and a second position, as shown in FIG. 8, for operating the braking mechanism. More specifically, the braking apparatus 34 includes the brake pedal assembly 60. The first position is further defined as the "non-depressed" position of the brake pedal assembly 60. Said differently, in the first position the brake pedal assembly 60 is the closest to the user. Further, in the first position the braking mechanism is not activated. The second position is further defined as any position other than the first position. The second position is further spaced from the user than the first position. The braking mechanism is activated when the brake pedal assembly 60 is in the second position. As will be described below, the brake pedal assembly 60 has a locked condition preventing movement out of the second position for continuously actuating the braking mechanism. The brake pedal assembly 60 engages the intermediate device 46 when in the locked condition.

The brake pedal assembly 60 may include a brake pedal arm 62 having a first end 64 and a second end 66 and a brake pedal pad 68 coupled to the brake pedal arm 62 at the first end 64 with the brake pedal arm 62 pivotable about the axis A at the second end 66 as the brake pedal assembly 60 moves between the first and second positions. As shown in FIG. 4, the brake pedal arm 62 extends into the interior 44 of the support 36. The second end 66 of the brake pedal arm 62 is mounted to and movable with the shaft 42 to facilitate movement of the brake pedal assembly 60 between the first and second positions. The movement of the brake pedal assembly 60 about the axis A is further defined as pivoting about the axis A with the shaft 42 as the shaft 42 rotates about the axis A. However, it is to be appreciated that the brake pedal may rotate relative to the shaft 42.

Figure 7:
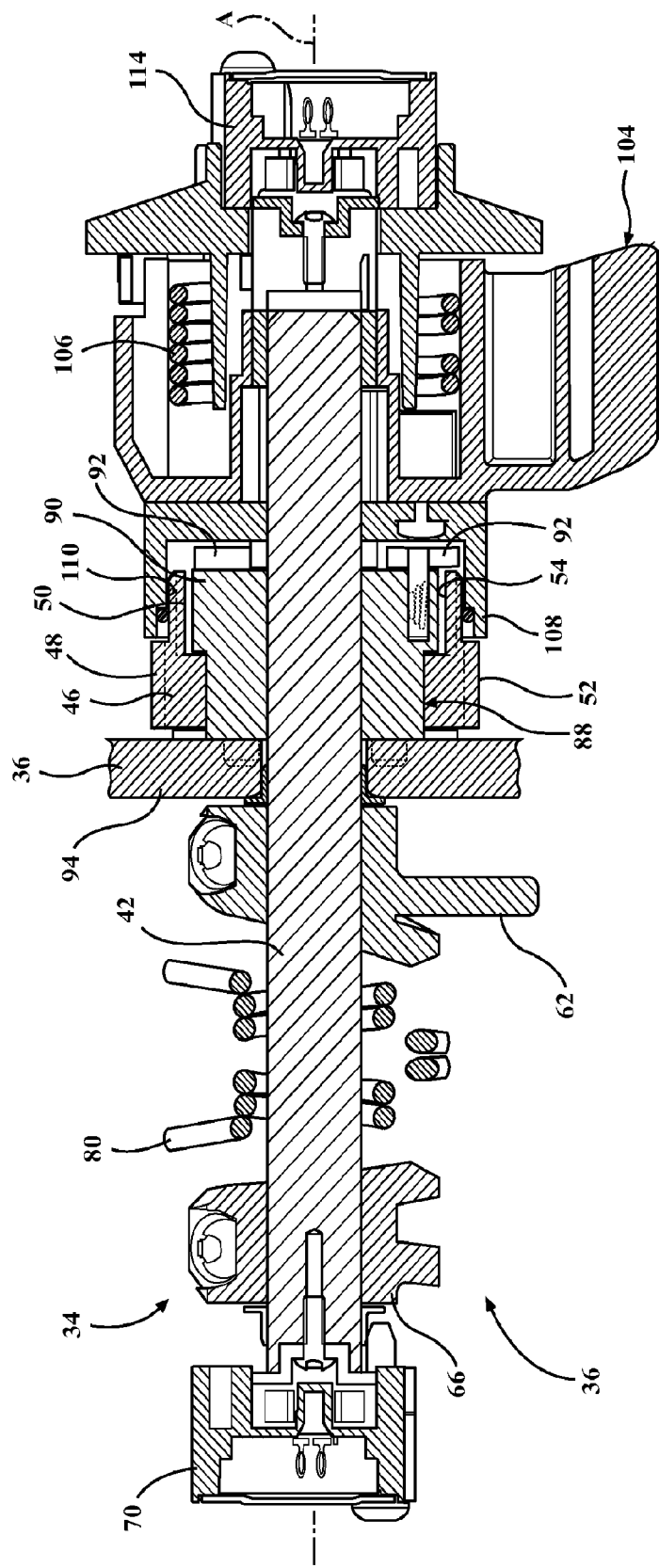
FIG. 7 is a cross-sectional rear view of the pedal apparatus of FIG. 5 with the support removed.
Figure 15:
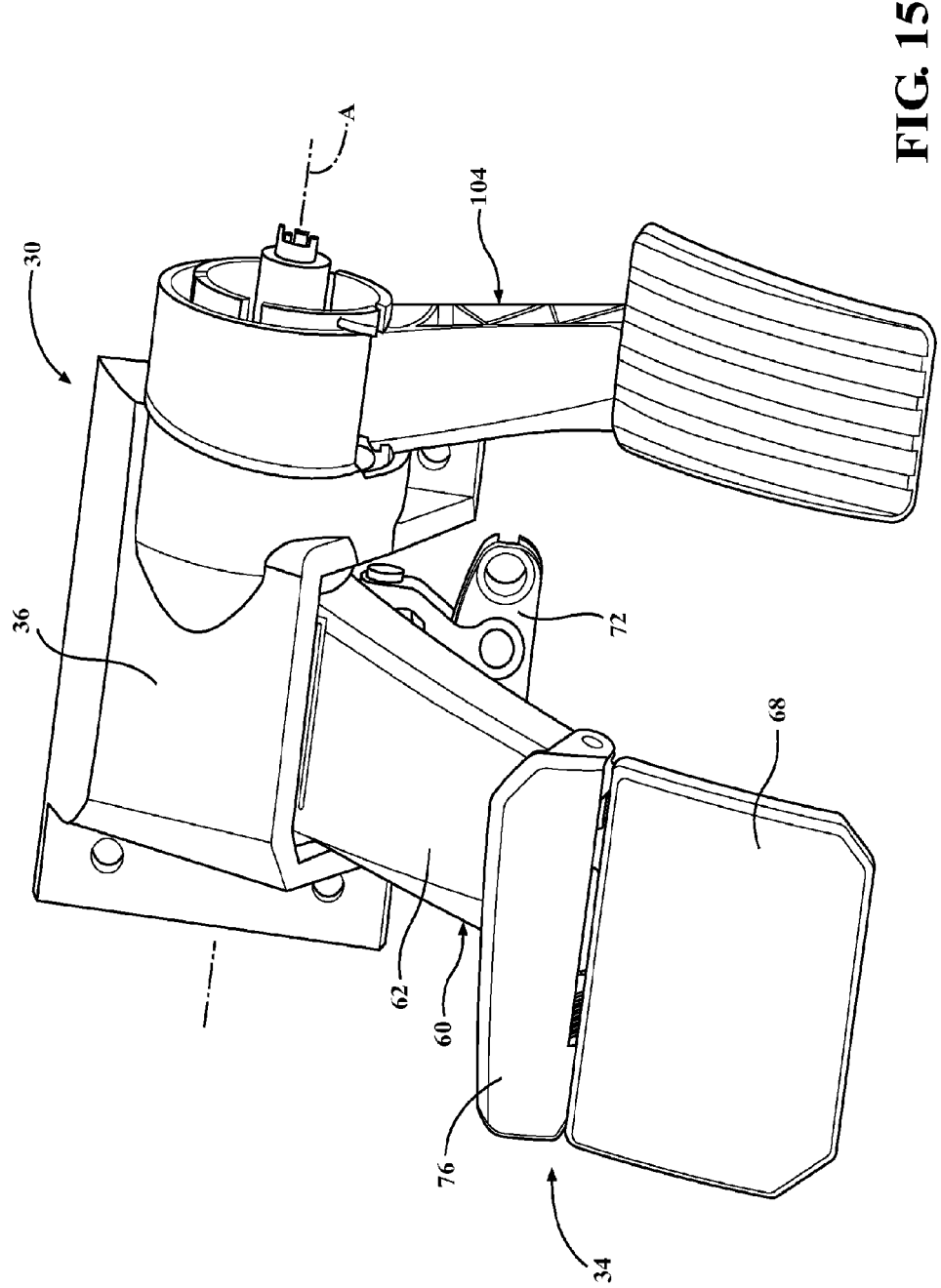
FIG. 15 is a perspective front view of an alternative pedal apparatus.

As shown in FIG. 7, the pedal apparatus 30 may further include a first sensor 70 coupled to the brake pedal assembly 60 and transmitting a first signal for operating the braking mechanism. As described above, the braking apparatus 34 may operate the braking mechanism by electronic actuation. The first sensor 70 monitors the position of brake pedal assembly 60 and transmits the first signal to the braking mechanism that controls the degree of braking imparted by the braking mechanism on the vehicle 32. Alternatively, as shown in FIG. 15, the brake pedal assembly 60 may include a brake cable attachment 72. The vehicle 32 may include a brake cable coupled to each of the braking mechanism and the brake cable attachment 72 of the brake pedal assembly 60. The brake cable transmits motion from the brake pedal assembly 60 to the braking mechanism for operating the braking mechanism.

As shown in FIG. 4, the brake pedal assembly 60 may include a park brake actuator 74. The park brake actuator 74 is coupled to the brake pedal arm 62 and is movable relative to the brake pedal arm 62. The park brake actuator 74 has a park brake pad 76 and a plurality of links 78 with the park brake pad 76 disposed adjacent the brake pedal pad 68 and the links 78 coupled to the park brake pad 76 and extending along the brake pedal arm 62 toward the second end 66. Movement of the park brake actuator 74 is further defined as pivoting of the park brake pad 76 and corresponding movement of the links 78.

The pedal apparatus 30 may further include a first biasing member 80 coupled to and biasing the brake pedal assembly 60 toward the first position. More specifically, the braking apparatus 34 may further include the first biasing member 80 coupled to and biasing the brake pedal assembly 60 toward the first position. The first biasing member 80 is coupled to the support 36 and the brake pedal arm 62 at the second end 66. The first biasing member 80 biases the brake pedal assembly 60 toward the first position.

Figure 10:
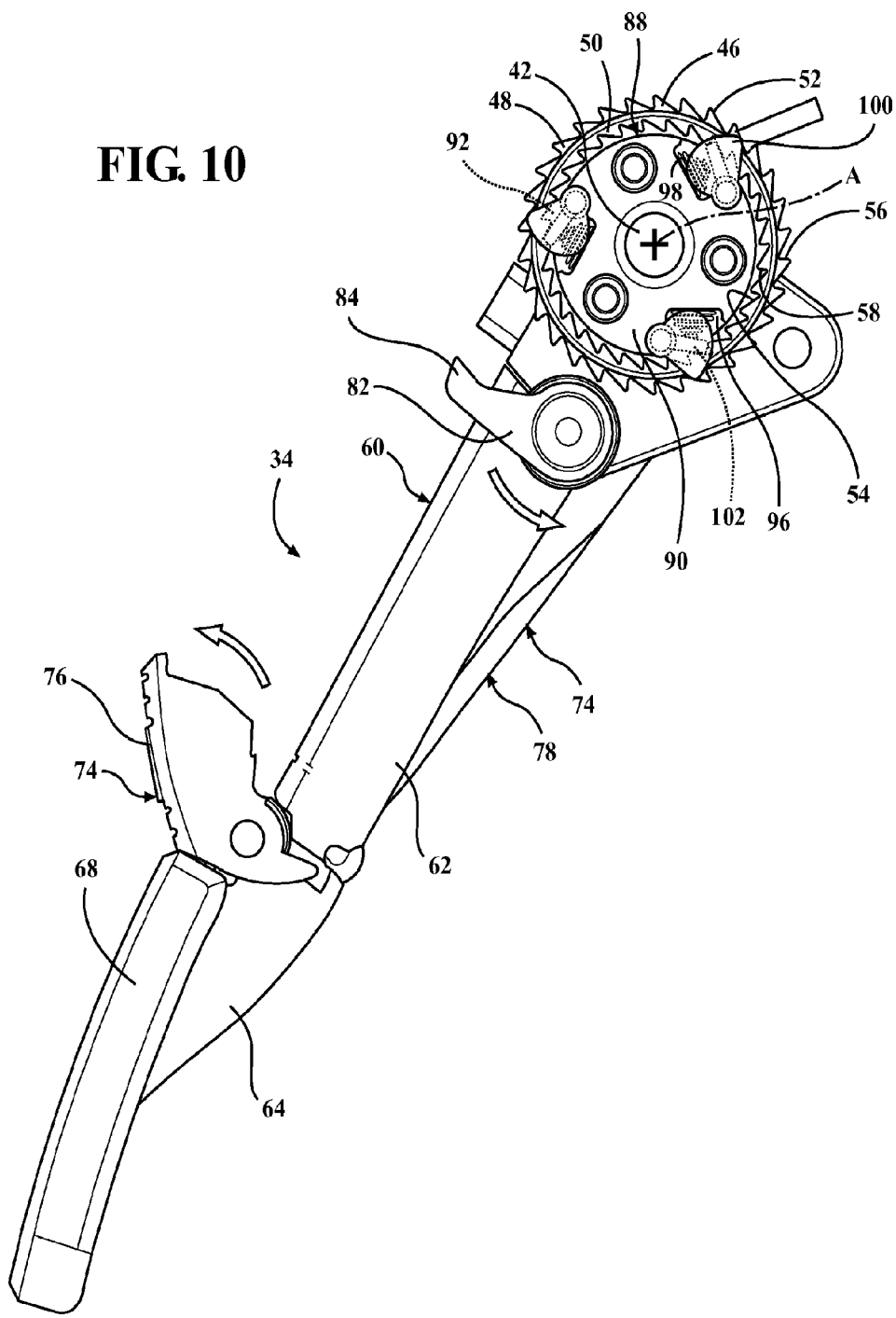
FIG. 10 is a side elevational view of the brake pedal assembly of the pedal apparatus of FIG. 5 with the brake pedal assembly in the second position, the latch in the unlocked position and disengaged from the intermediate device, and the retainer engaging the intermediate device.

The pedal apparatus 30 includes a latch 82 movable between unlocked and locked positions (as shown in FIGS. 10 and 8, respectively) independent of the movement of the brake pedal assembly 60 between the first and second positions. More specifically, the braking apparatus 34 includes the latch 82. The latch 82 is engageable with at least one of the first teeth 48 when in the locked position to couple the brake pedal assembly 60 to the intermediate device 46.

The movement of the latch 82 between the unlocked and locked positions may be further defined as pivoting of the latch 82 between the unlocked and locked positions. The park brake actuator 74 is coupled to each of the latch 82 and the brake pedal arm 62 with the park brake actuator 74 movable relative to the brake pedal arm 62 to move the latch 82 between the unlocked and locked positions. Specifically, the latch 82 is pivotably coupled to the brake pedal arm 62 at the second end 66 and is coupled to the links 78 of the park brake actuator 74. The pivoting of the park brake pedal and corresponding movement of the links 78 facilitates pivoting of the latch 82. Specifically, the latch 82 is normally disposed in the unlocked position. Pivoting of the park brake pedal toward the brake pedal arm 62 results in pivoting of the latch 82 toward the locked position. The latch 82 may be continuously biased away from the first teeth 48. Said differently, the latch 82 may be continuously biased toward the unlocked position. However, it is to be appreciated that the latch 82 may be continuously biased toward the first teeth 48 or any other suitable configuration.

The latch 82 pivots into engagement with the at least one of the first teeth 48 in the locked position, as shown in FIG. 8. The latch 82 extends to a distal end and has at least one barb 84 disposed at the distal end. The barb 84 is configured to engage at least one of the first teeth 48. Specifically, the barb 84 abuts the engagement surface 56 of the at least one of the first teeth 48. The angle of the engagement surface 56 such that the engagement surface 56 at least partially faces the axis A retains the engagement of the barb 84 with the at least one of the first teeth 48 and prevents easy disengagement of the latch 82 due to the biasing of the latch 82 away from the first teeth 48.

Figure 18:
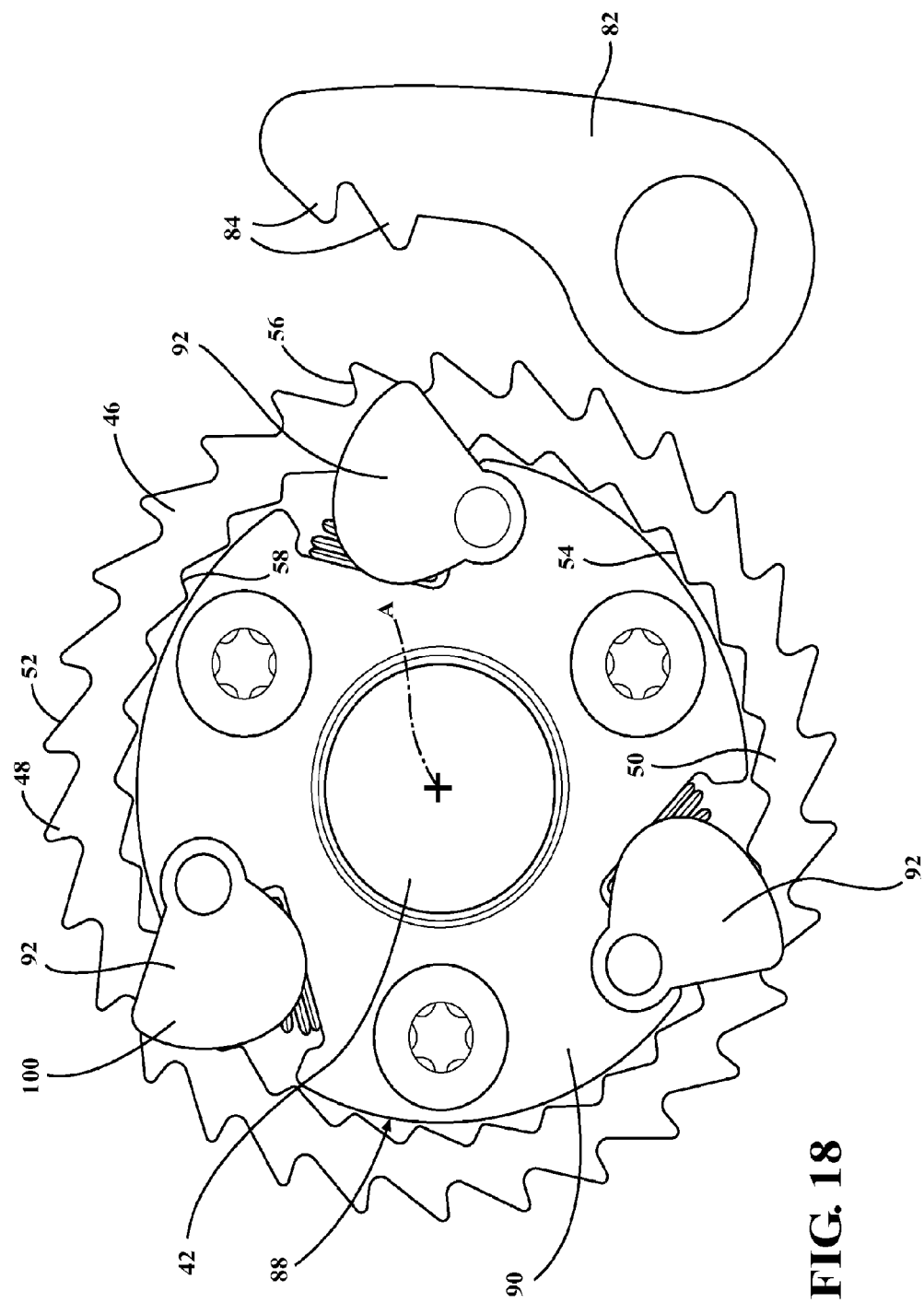
FIG. 18 is a plan view of a retainer, intermediate device, and latch of the pedal apparatus of FIG. 15.

It is to be appreciated that the latch 82 may have any number of barbs 84. As an example, as shown in FIG. 18, the latch 82 has two barbs 84 that engage the first teeth 48. It is also to be appreciated that the configuration of barb 84 may vary according to the configuration of the latch 82 relative to the intermediate device 46. For example, as shown in FIG. 8, the barb 84 is linearly disposed on the latch 82 such that force exerted by the intermediate device 46 on the latch 82 (when the latch 82 is engaged with the intermediate device 46) places the latch 82 in compression. In another example, as shown in FIG. 18, the barb 84 has a hooked configuration. Force exerted by the intermediate device 46 on the latch 82 (when the latch 82 is engaged with the intermediate device 46) places the latch 82 in tension. It is to be appreciated that the barb 84 and the latch 82 may have any suitable configuration for engaging the first teeth 48 of the intermediate device 46.

As described above, the intermediate device 46 is capable of rotating about the axis A. As will be described below, the intermediate device 46 is selectively retained to prevent rotation of the intermediate device 46 when the latch 82 engages the first teeth 48. In particular, the brake pedal assembly engages the intermediate device 46 when in a locked condition.

Figure 2:
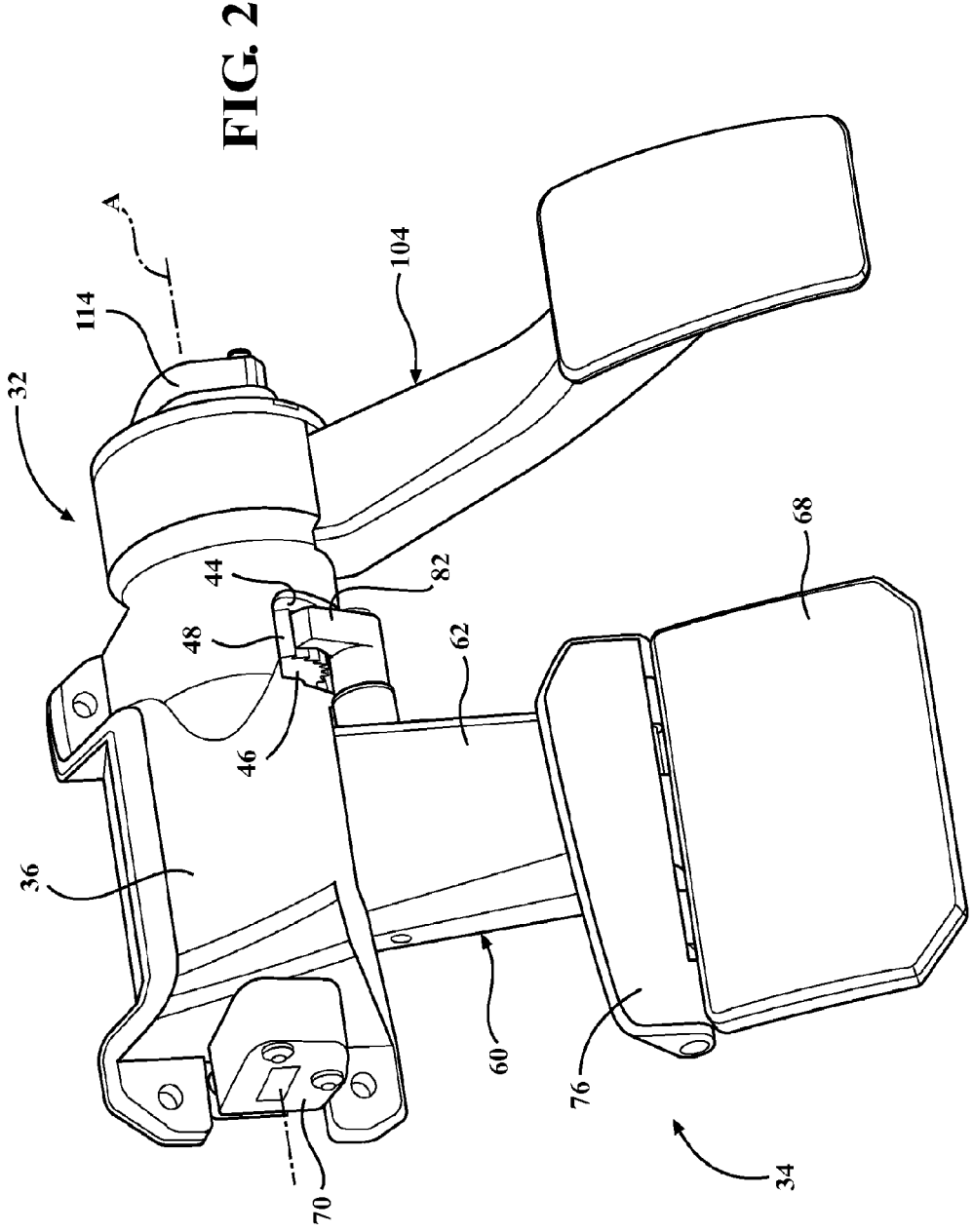
FIG. 2 is a perspective view of the pedal apparatus of FIG. 1.
Figure 3:
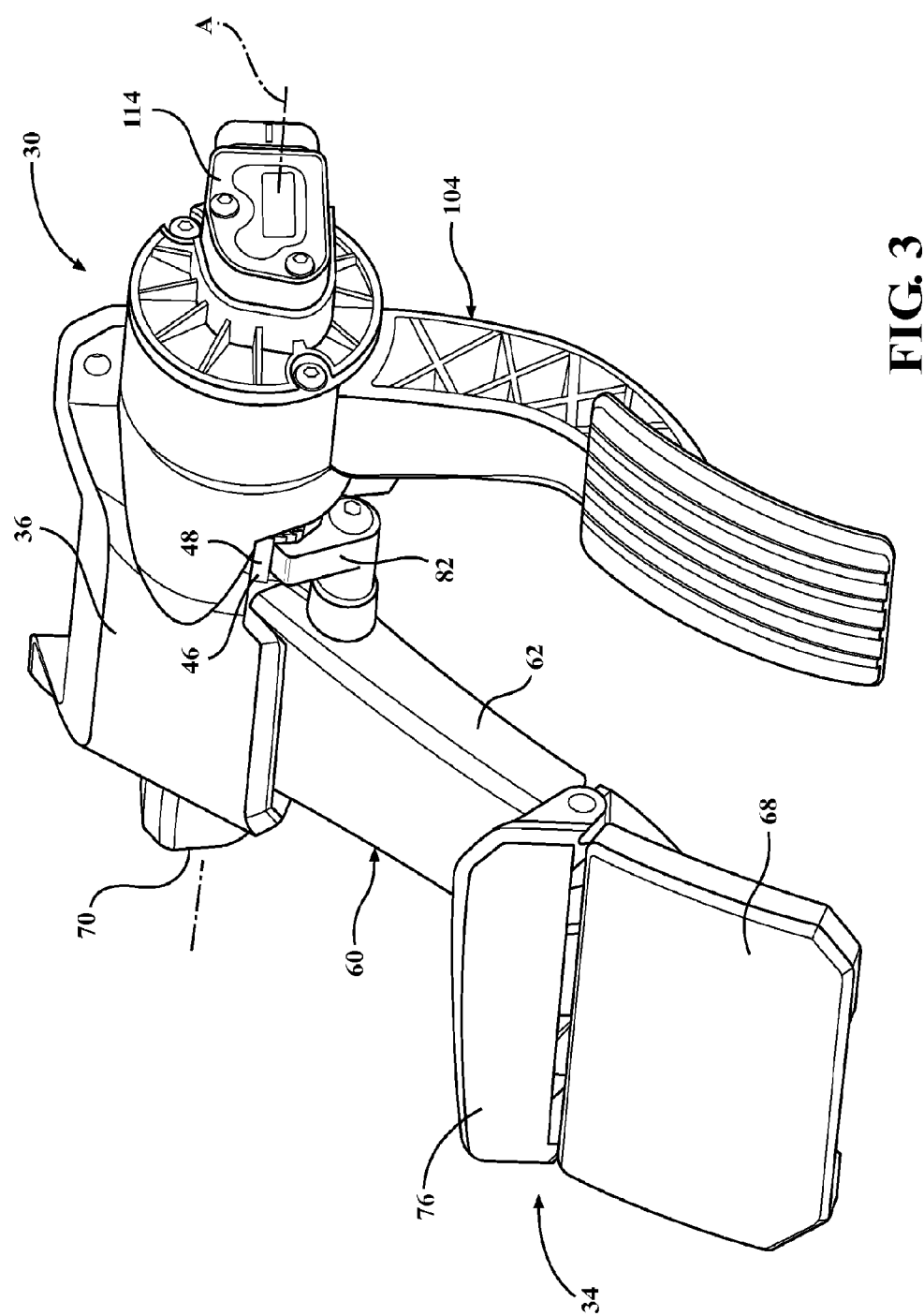
FIG. 3 is another perspective view of the pedal apparatus of FIG. 1.
Figure 16:
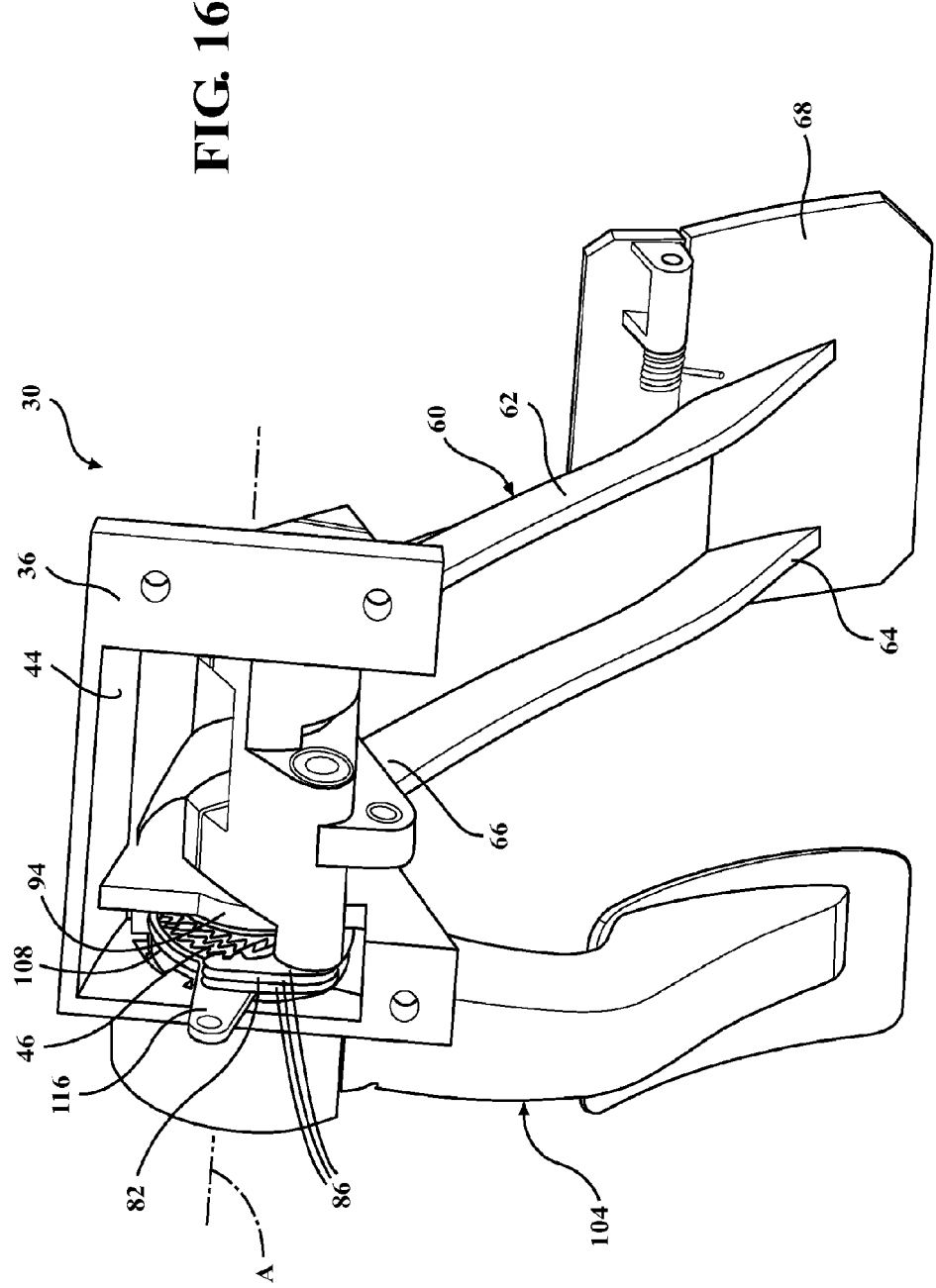
FIG. 16 is a perspective rear view of the pedal apparatus of FIG. 15.

The latch 82 may be a unitary component as shown in FIG. 2, or may include a plurality of sheets 86 stacked upon one another, as shown in FIG. 16. Each sheet is identically configured. The stacking of the sheets 86 extend the latch 82 longitudinally relative to the axis A.

As shown FIG. 7, the pedal apparatus 30 includes a retainer 88 disposed about the axis A. More specifically, the braking apparatus 34 includes the retainer 88. The retainer 88 is disposed about the shaft 42 and the axis A. The retainer 88 is disposed within the interior 44 of the support 36. However, it is to be appreciated that the retainer 88 may be disposed outside of the support 36.

As shown in FIG. 8, the retainer 88 may have a circular configuration concentrically disposed about the axis A. Said differently, the retainer 88 extends radially from the shaft 42. It is to be appreciated that the retainer 88 may have any configuration disposed about the axis A. The shaft 42 is rotatable relative to the retainer 88.

The retainer 88 is disposed between the shaft 42 and the intermediate device 46. The intermediate device 46 is concentrically disposed about at least a portion of the retainer 88. More specifically, the intermediate device 46, having the annular configuration, is concentrically disposed about the axis A and surrounds at least a portion of the retainer 88. In the embodiment illustrated, see FIG. 7 for example, the intermediate device 46 is concentrically disposed about a majority of the retainer 88. Said differently, the retainer 88 is aligned along axis A with the retainer 88 disposed radially between the shaft 42 and the intermediate device 46.

The retainer 88 has a hub 90 mounted to the support 36 and at least one actuating device 92. More specifically, the support 36 has a flange 94 extending toward the shaft 42. The hub 90 is mounted to the flange 94 by a plurality of fasteners. It is to be appreciated that the hub 90 may be mounted to the flange 94 by any suitable means.

The hub 90 defines a perimeter radially spaced from the axis A. The at least one actuating device 92 is disposed along the perimeter of the hub 90. The at least one actuating device 92 selectively engages the intermediate device 46 to couple the intermediate device 46 to the retainer 88 for retaining the brake pedal assembly 60 in the locked condition. The at least one actuating device 92 selectively engages at least one of the second teeth 50 of the intermediate device 46 to couple the intermediate device 46 to the retainer 88 and the support 36 for retaining the latch 82 in the locked position and the brake pedal assembly 60 in the second position.

As shown in FIG. 8, the at least one actuating device 92 is three actuating devices 92 spaced from each other about perimeter of the hub 90. It is to be appreciated that the actuating device 92 may be any number of actuating devices 92.

Figure 12:
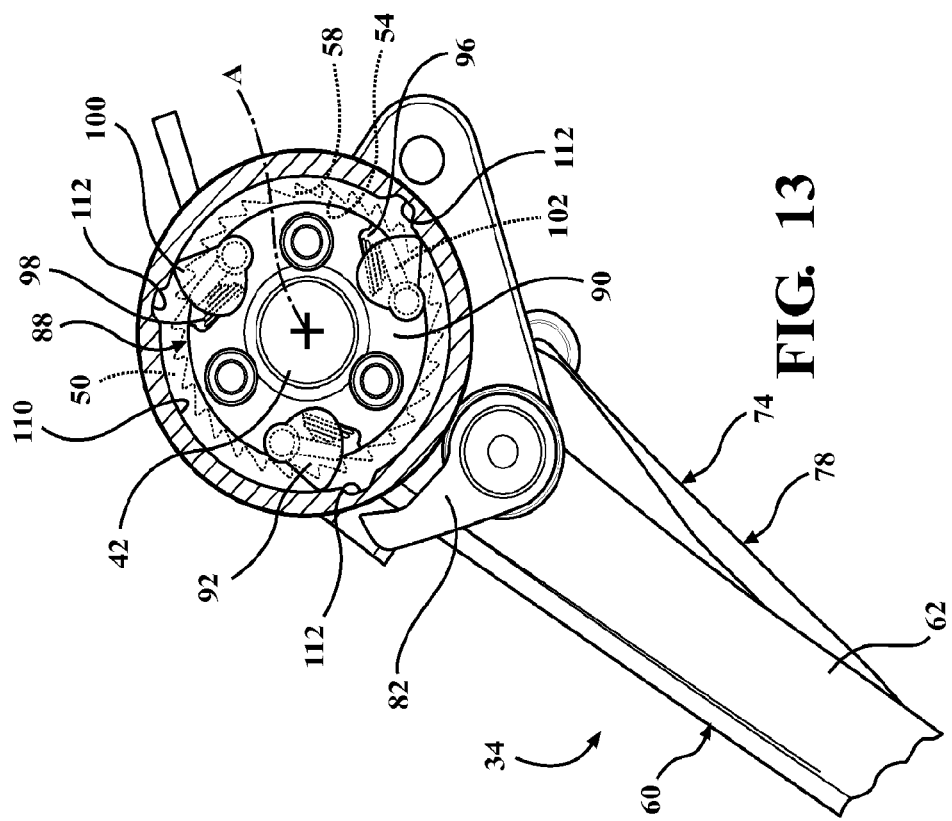
FIG. 12 is a fragmented partially cross-sectional side view of an extension of the accelerator pedal assembly of FIG. 5, with the extension defining channels, and the retainer having an actuating device partially disposed in the channels.
Figure 13:
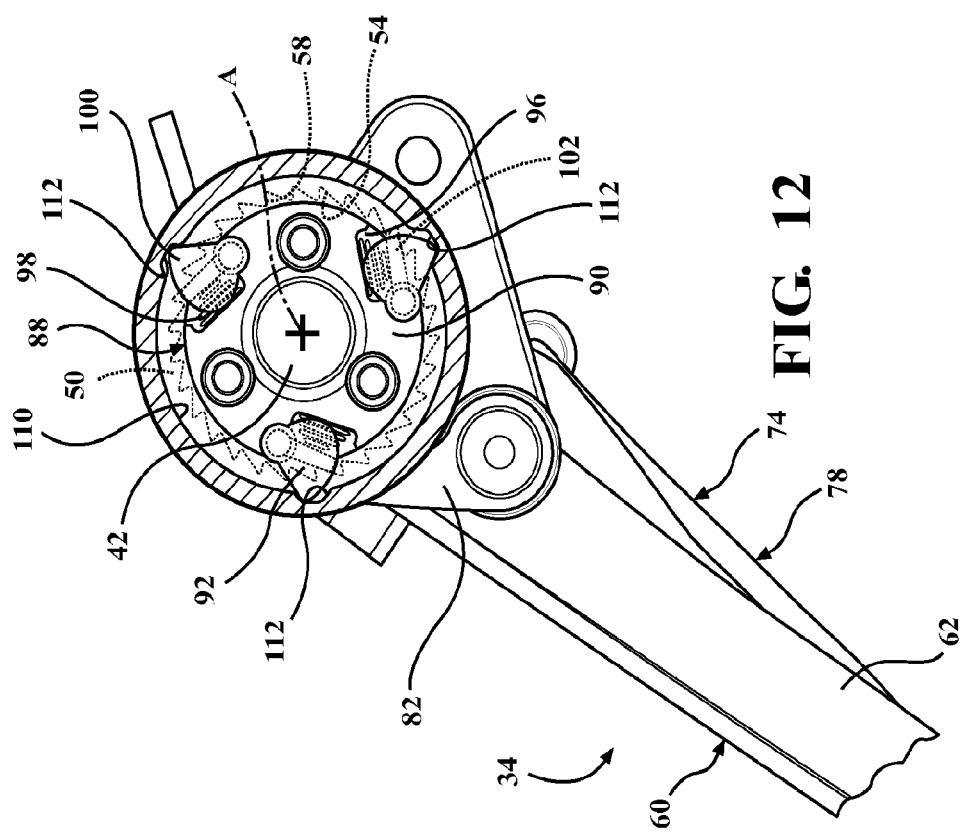
FIG. 13 is a fragmented partially cross-sectional side view of the extension of the accelerator pedal assembly of FIG. 5 with the actuating devices engaged by the extension and spaced from the channels.

The actuating device 92 may be pivotably coupled to the hub 90 to facilitate selective engagement of the actuating device 92 with the second teeth 50 of the intermediate device 46, as shown in FIGS. 12 and 13. The hub 90 may define at least one cavity 96 with the actuating device 92 at least partially disposed within the cavity 96 and pivoting within the cavity 96 away from the second teeth 50 of the intermediate device 46 to disengage the actuating device 92 from the second teeth 50. Said differently, the hub 90 defines the at least one cavity 96 along the perimeter of the hub 90.

The actuating device 92 may be biased away from the axis A to selectively engage at least one of the second teeth 50 of the intermediate device 46. The retainer 88 includes a biasing device 98 disposed within each of the at least one cavity 96 with the biasing device 98 abutting each of the hub 90 and the actuating device 92 to bias the actuating device 92 away from the axis A and toward the second teeth 50 of the intermediate device 46.

The actuating device 92 may have a lobe 100 and a tab 102 spaced from each other with the tab 102 selectively engaging the second teeth 50. The lobe 100 is disposed adjacent to the intermediate device 46 along the axis A. The lobe 100 radially extends past the first teeth 48 of the intermediate device 46 toward the support 36, as shown in FIG. 14. The tab 102 extends substantially parallel to the axis A, as generally shown in FIG. 8. The tab 102 is configured to abut the contact surface 58 of the second teeth 50 of the intermediate device 46. The tab 102 is continuously biased toward the second teeth 50. More specifically, the biasing device 98 continuously biases the tab 102 toward the second teeth 50. The latch 82 pivots into engagement with the at least one of the first teeth 48 in the locked position and the tab 102 of the actuating device 92 selectively pivots into engagement with the second teeth 50.

As described above, the first and second teeth 48, 50 of the intermediate device 46 may have opposing configurations. The engagement of the latch 82 with the first teeth 48 opposes the engagement of the actuating device 92 with the second teeth 50 to prevent rotation of the intermediate device 46 about the axis A. Said differently, the engagement of the latch 82 with first teeth 48 prevents rotation of the intermediate device 46 about the axis A in a first direction. The engagement of the actuating device 92 with the second teeth 50 prevents rotation of the intermediate device 46 about the axis A in a second direction, opposite the first direction. The retainer 88, which is mounted to the support 36, retains the intermediate device 46 and the intermediate device 46 retains the latch 82 which is coupled to the brake pedal assembly 60. In doing so, the brake pedal assembly 60 is retained by the support 36 when the latch 82 engages the first teeth 48 of the intermediate device 46 and the actuating device 92 engages the second teeth 50 of the intermediate device 46. The brake pedal assembly 60 is in the locked condition when the brake pedal assembly 60 is retained by the support 36.

The operation of activating the braking mechanism and maintaining the vehicle 32 in the parked state using the braking apparatus 34 will be discussed below for illustrative purposes only. In addition, the operation of releasing the vehicle 32 from the parked state using the braking apparatus 34 will also be discussed for illustrative purposes only.

As shown in FIG. 8, the actuating device 92 is continuously biased toward the second teeth 50 of the intermediate device 46. The tab 102 of the actuating device 92 abuts the contact surface 58 of at least one of the second teeth 50 preventing rotation of the intermediate device 46 in the second direction about the axis A.

The user moves the brake pedal assembly 60 from the first position, as shown in FIG. 11, to the second position, as shown in FIG. 8, to activate the braking mechanism. The vehicle 32 may already be stopped. If the vehicle 32 is in motion, activation of the braking mechanism slows the vehicle 32 until the vehicle 32 has stopped. With the brake pedal assembly 60 in the second position, the user pivots the park brake pad 76 toward the brake pedal arm 62, as shown in FIG. 8. The pivoting of the brake pedal arm 62 moves the links 78. The movement of the links 78 pivots the latch 82 from the unlocked position to the locked position. The barb 84 of the latch 82 engages the engagement surface 56 of at least one of the first teeth 48 preventing rotation of the intermediate device 46 in the first direction about the axis A. The bias of the first biasing member 80 facilitates engagement of the latch 82 with the first teeth 48 of the intermediate device 46 for retaining the latch 82 in the locked position and the brake pedal in the second position. Specifically, the bias of the first biasing member 80 pivots the brake pedal assembly 60 toward the first position which also maintains engagement of the barb 84 with the engagement surface 56.

The latch 82 engages the first teeth 48 and the actuating device 92 engages the second teeth 50 concurrently to facilitate coupling of the brake pedal assembly 60 to the support 36 and retain the brake pedal assembly 60 in the second position. More specifically, the retainer 88, which is mounted to the support 36, retains the intermediate device 46 through the engagement of the actuating device 92 with the second teeth 50 of the intermediate device 46. The intermediate device 46 retains the latch 82 and the brake pedal assembly 60 through the engagement of the latch 82 with the first teeth 48 of the intermediate device 46. The brake pedal assembly 60 is retained by the support 36 in the second position, and is in the locked condition, which maintains activation of the braking mechanism.

Figure 9:
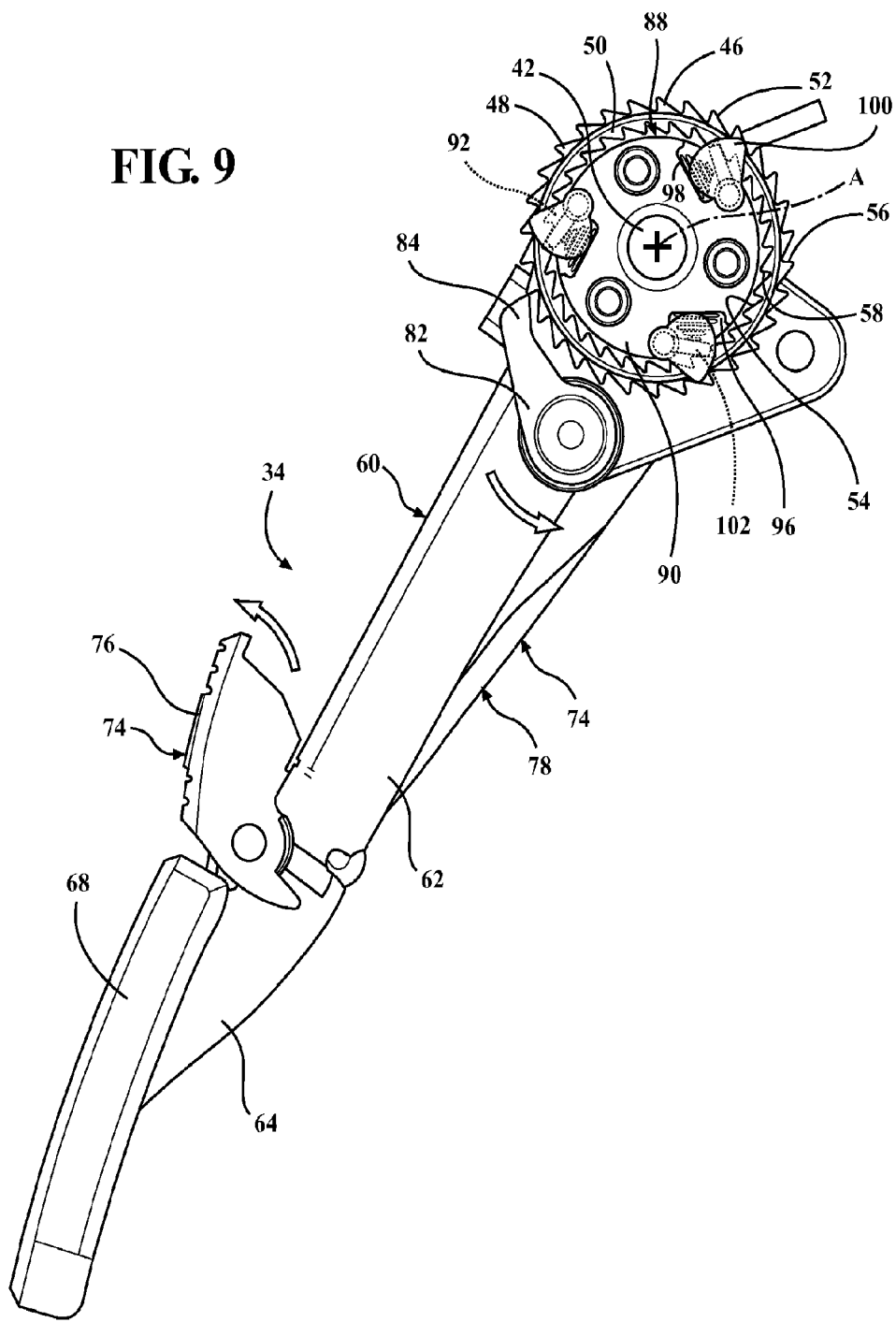
FIG. 9 is a side elevational view of the brake pedal assembly of the pedal apparatus of FIG. 5 with the brake pedal assembly in the second position, the latch engaging the intermediate device and moving from the locked position to an unlocked position, and the retainer engaging the intermediate device.

To deactivate the braking mechanism using the braking apparatus 34, the user further pivots the brake pedal assembly 60, against the bias of the first biasing member 80, away from the first position, as shown in FIG. 9. The latch 82 is biased away from the unlocked position causing the barb 84 to slide along the engagement surface 56 having the angular configuration. The brake pedal assembly 60 continues to pivot. The barb 84 slides off of the engagement surface 56 and the latch 82 continues pivoting to the unlocked position, as shown in FIG. 10. With the latch 82 disengaged from the intermediate device 46, the brake pedal assembly 60 is no longer connected to the support 36 through the intermediate device 46 and the retainer 88. The user releases the brake pedal assembly 60 and the bias of the first biasing member 80 pivots the brake pedal assembly 60 to the first position, as shown in FIG. 11. In the first position, the braking mechanism is not activated which allows the vehicle 32 to move. The vehicle 32 is no longer in the parked state.

The pedal apparatus 30 includes an accelerator pedal assembly 104, as shown in FIGS. 2-6 and 15-17. The primary use of the accelerator pedal assembly 104 is for operating the prime mover. Additionally, the accelerator pedal assembly 104 can selectively disconnect the brake pedal assembly 60 from retainment to the support 36 in the second position, as described above, which allows the brake pedal assembly 60 to pivot to the first position and deactivate the braking mechanism.

The accelerator pedal assembly 104 is movable about the axis A between an initial position and a displaced position for operating the prime mover. The movement of the accelerator pedal about the axis A is further defined as pivoting of the accelerator pedal about the axis A. The initial position is further defined as the "non-depressed" position of the accelerator pedal assembly 104. Said differently, in the initial position the accelerator pedal assembly 104 is the closest to the user. Further, in the initial position the accelerator pedal assembly 104 is not operating the prime mover. The displaced position is further defined as any position other than the initial position. The displaced position is further spaced from the user than in the initial position. The accelerator pedal assembly 104 operates the prime mover when the accelerator pedal assembly 104 is in the displaced position. The pedal apparatus 30 further includes a second biasing member 106 coupled to and biasing the accelerator pedal assembly 104 toward the initial position, as shown in FIG. 7.

The shaft 42 may couple the brake and accelerator pedal assemblies to the support 36. More specifically, the accelerator pedal assembly 104 is movable about and relative to the shaft 42 to facilitate the movement of the accelerator pedal assembly 104 independent of the movement of the brake pedal assembly 60 with the shaft 42.

As shown in FIG. 13, the accelerator pedal assembly 104 engages the lobe 100 to correspondingly move the tab 102 out of engagement with the second teeth 50 of the intermediate device 46. More specifically, the accelerator pedal assembly 104 may include an extension 108 having an abutment surface 110. The extension 108 is concentrically disposed about at least a portion of the retainer 90. As shown, the intermediate device is concentrically disposed about the hub and the extension 108 is concentrically disposed about a portion of the actuation device. In the embodiment shown in FIG. 7, the extension 108 is also concentrically disposed about a portion of the intermediate device 46. Alternatively, the extension 108 may be disposed axially adjacent to the intermediate device 46, as shown in FIGS. 16 and 17. As shown, the extension 108 can have an annular configuration with the extension 108 concentrically disposed about the axis A and the retainer 90. The abutment surface 110 is disposed within the annularly configured extension 108 and substantially faces the axis A. The extension 108 is radially disposed about the axis A and extends longitudinally along the axis A toward the brake pedal assembly 60. The concentric disposition of the retainer 88, the intermediate device 46, and the extension 108 about the axis A makes the pedal apparatus compact, which takes up less volume in the vehicle 32.

The extension 108 selectively engages the actuating device 92 to disengage the actuating device 92 from the intermediate device 46 and release the brake pedal assembly 60 from the locked condition, as shown in FIG. 13. The extension 108 selectively engages the actuating device 92 as the accelerator pedal assembly 104 moves between the initial and displaced positions (as shown in FIGS. 12 and 13, respectively) to disengage the actuating device 92 from the second teeth 50 of the intermediate device 46. More specifically, the abutment surface 110 selectively engages the actuating device 92 as the accelerator pedal assembly 104 moves between the initial and displaced positions. As described above, the lobe 100 of the actuating device 92 is disposed adjacent to the intermediate device 46 along the axis A. The lobe 100 radially extends past the first teeth 48 of the intermediate device 46 toward the support 36, as shown in FIG. 7. More specifically, the lobe 100 extends toward the extension 108.

As shown in FIG. 12, the extension 108 defines at least one channel 112 with the channel 112 at least partially defined by the abutment surface 110. The channel 112 extends along the extension 108 substantially parallel to the axis A. The lobe 100 of the actuating device 92 extends into the channel 112 spaced from the abutment surface 110. As described above, in the example shown the at least one actuating device 92 is further defined as three actuating devices 92 spaced from each other about the perimeter of the hub 90. Likewise, the at least one channel 112 is further defined as three channels 112 spaced from each other about the hub 90. It is to be appreciated that the channels 112 may be any number of channels 112. The channels 112 are configured such that each lobe 100 individually extends into the channels 112, concurrently. Said differently, each lobe 100 of the actuating devices 92 is concurrently selectively disposed within the respective channel 112 of each lobe 100. The channels 112 are configured such that the lobes 100 are disposed within the channels 112 when the accelerator pedal assembly 104 is in the initial position. With the lobe 100 disposed in the channel 112, the tab 102 of the actuating device 92 engages the second teeth 50 of the intermediate device 46 when the accelerator pedal assembly 104 is in the initial position.

As the accelerator pedal assembly 104 pivots about the axis A from the initial position to the displaced position, the extension 108 rotates as well about the axis A. The rotation of the extension 108 about the axis A causes the channels 112 to move relative to the lobe 100 of the actuating devices 92, as shown in FIG. 13. The rotation of the extension 108 results in the abutment surface 110 engaging the lobe 100. The selective engagement of the abutment surface 110 with the actuating device 92 disengages the actuating device 92 from the second teeth 50 of the intermediate device 46. The actuating devices 92 pivot against the bias of the biasing devices 98 away from the second teeth 50. The disengagement of the actuating devices 92 from the second teeth 50 releases the latch 82 from engagement with the first teeth 48 of the intermediate device 46. More specifically, with the actuating devices 92 disengaged from the second teeth 50, the intermediate device 46 is disengaged from the support 36. The intermediate device 46 is allowed to freely rotate about the axis A.

The bias of the latch 82 toward the unlocked position facilitates disengagement of the latch 82 from the exterior teeth of the intermediate device 46 when the actuating device 92 disengages from the second teeth 50 of the intermediate device 46. More specifically, with the intermediate device 46 allowed to freely rotate, the bias of the latch 82 toward the unlocked position causes the intermediate device 46 to rotate. The rotation of the intermediate device 46 causes the latch 82 to disengage the first teeth 48 of the intermediate device 46. The bias of the first biasing member 80 returns the brake pedal assembly 60 from the second position to the first position.

Figure 19:
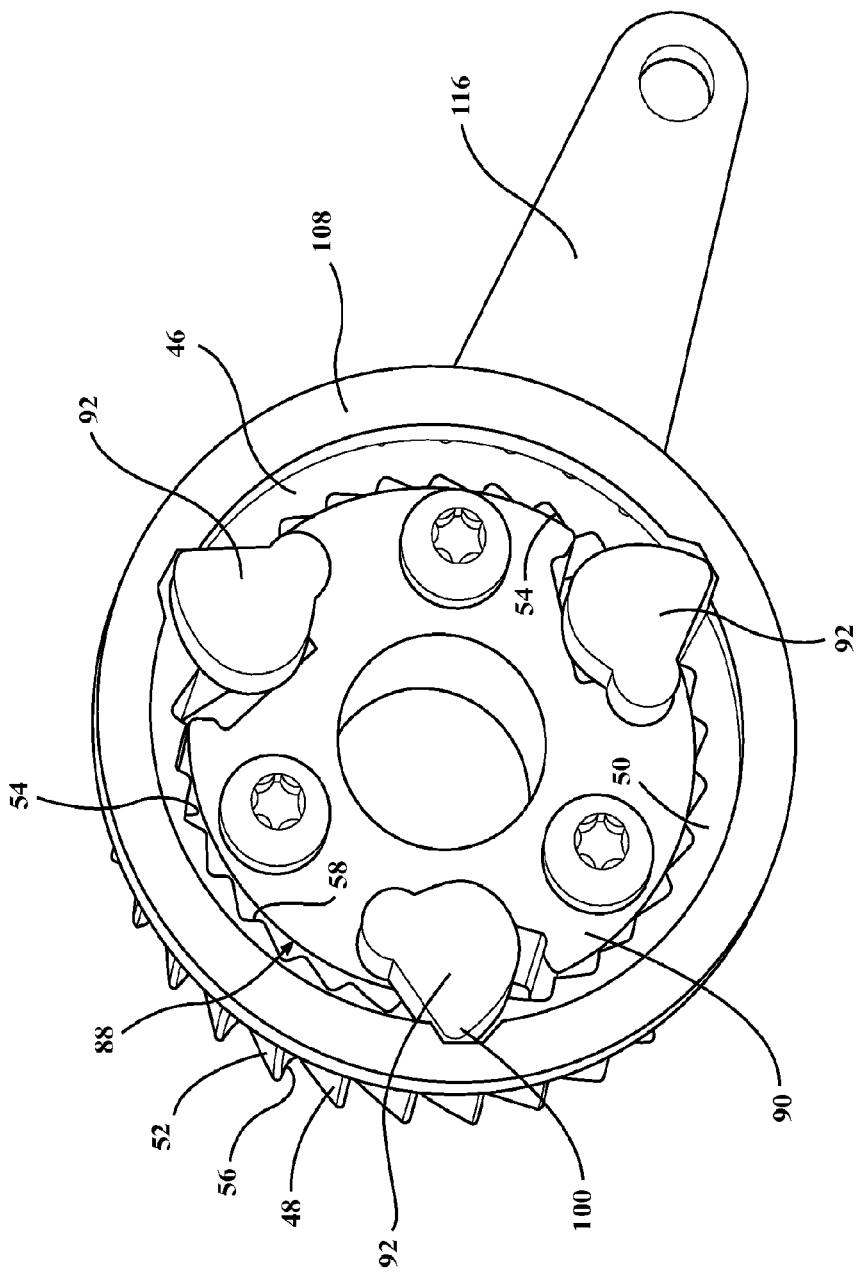
FIG. 19 is a perspective view of the retainer, the intermediate device and an extension of the pedal apparatus of FIG. 15.

As shown in FIG. 7, the pedal apparatus 30 may further include a second sensor 114 coupled to the accelerator pedal assembly 104 and transmitting a second signal for operating the prime mover. Like the braking apparatus 34 with the braking mechanism, the accelerator pedal assembly 104 may activate the prime mover by electronic actuation. The second sensor 114 monitors the position of accelerator pedal assembly 104 and transmits the second signal to the prime mover that controls the speed of the vehicle 32. Alternatively, as shown in FIGS. 16, 17, and 19, the extension 108 of the accelerator pedal assembly 104 may include an accelerator cable attachment 116. The vehicle 32 may include an accelerator cable coupled to each of the prime mover and the accelerator cable attachment 116 of the accelerator pedal assembly 104. The accelerator cable transmits motion from the accelerator pedal assembly 104 to the prime mover for operating the prime mover.

The operation of activating the braking mechanism and maintaining the vehicle 32 in parked state using the braking apparatus 34, with additional reference to the position of the accelerator pedal assembly 104, will be discussed below for illustrative purposes only. The operation of releasing brake pedal assembly 60 from the locked condition and the vehicle 32 from the parked state using the accelerator pedal assembly 104 will also be discussed for illustrative purposes only.

The actuating device 92 is continuously biased toward the second teeth 50 of the intermediate device 46, as shown in FIG. 12. To engage the tab 102 of the actuating device 92 with the second teeth 50, the user releases the accelerator pedal assembly 104 and the second biasing member 106 biases the accelerator pedal assembly 104 from the displaced position to the initial position. The continual bias of the actuating device 92 causes the lobe 100 of each actuating device 92 to be disposed in the respective channel 112 of each actuating device 92. The tab 102 of the actuating device 92 abuts the contact surface 58 of one of the second teeth 50 preventing rotation of the intermediate device 46 in the second direction about the axis A.

The user moves the brake pedal assembly 60 from the first position (as shown in FIG. 11) to the second position (as shown in FIG. 8) to activate the braking mechanism. The vehicle 32 may already be stopped. If the vehicle 32 is in motion, activation of the braking mechanism slows the vehicle 32 until the vehicle 32 has stopped. With the brake pedal assembly 60 in the second position, the user pivots the park brake pad 76 toward the brake pedal arm 62, as shown in FIG. 8. The pivoting of the brake pedal arm 62 moves the links 78. The movement of the links 78 pivots the latch 82 from the unlocked position to the locked position. The barb 84 of the latch 82 engages the engagement surface 56 of at least one of the first teeth 48 preventing rotation of the intermediate device 46 in the first direction about the axis A. The bias of the first biasing member 80 facilitates engagement of the latch 82 with the first teeth 48 of the intermediate device 46 for retaining the latch 82 in the locked position and the brake pedal in the second position. Specifically, the bias of the first biasing member 80 pivots the pedal assembly toward the first position which also maintains engagement of the barb 84 with the engagement surface 56.

The latch 82 engages the first teeth 48 and the actuating device 92 engages the second teeth 50 concurrently to facilitate coupling of the brake pedal assembly 60 to the support 36 and retain the brake pedal assembly 60 in the second position. More specifically, the retainer 88, which is mounted to the support 36, retains the intermediate device 46 through the engagement of the actuating device 92 with the second teeth 50 of the intermediate device 46. The intermediate device 46 retains the latch 82 and the brake pedal assembly 60 through the engagement of the latch 82 with the first teeth 48 of the intermediate device 46. The brake pedal assembly 60 is retained by the support 36 in the second position, and is in the locked condition, which maintains activation of the braking mechanism.

To deactivate the braking mechanism using the accelerator pedal assembly 104, the user pivots the accelerator pedal assembly 104, against the bias of the second biasing member 106, from the initial position (as shown in FIG. 12) toward the displaced position (as shown in FIG. 13).

As the accelerator pedal assembly 104 pivots about the axis A from the initial position to the displaced position, the extension 108 rotates as well about the axis A. The rotation of the extension 108 about the axis A causes the channels 112 to move relative to the lobe 100 of the actuating devices 92. The rotation of the extension 108 results in the abutment surface 110 engaging each lobe 100, as shown in FIG. 13. The actuating devices 92 pivot against the bias of the biasing devices 98 away from the second teeth 50. The tabs 102 of the actuating devices 92 disengage from the second teeth 50 of the intermediate device 46. With the actuating devices 92 disengaged from the second teeth 50, the intermediate device 46 is disengaged from the support 36. The intermediate device 46 is allowed to freely rotate about the axis A.

With the intermediate device 46 allowed to freely rotate, the bias of the latch 82 toward the unlocked position causes the intermediate device 46 to rotate. The rotation of the intermediate device 46 causes the latch 82 to disengage the first teeth 48 of the intermediate device 46. The bias of the first biasing member 80 returns the brake pedal assembly 60 from the second position to the first position. In the first position, the braking mechanism is not activated which allows the vehicle 32 to move. The vehicle 32 is no longer in the parked state.

Figure 20:
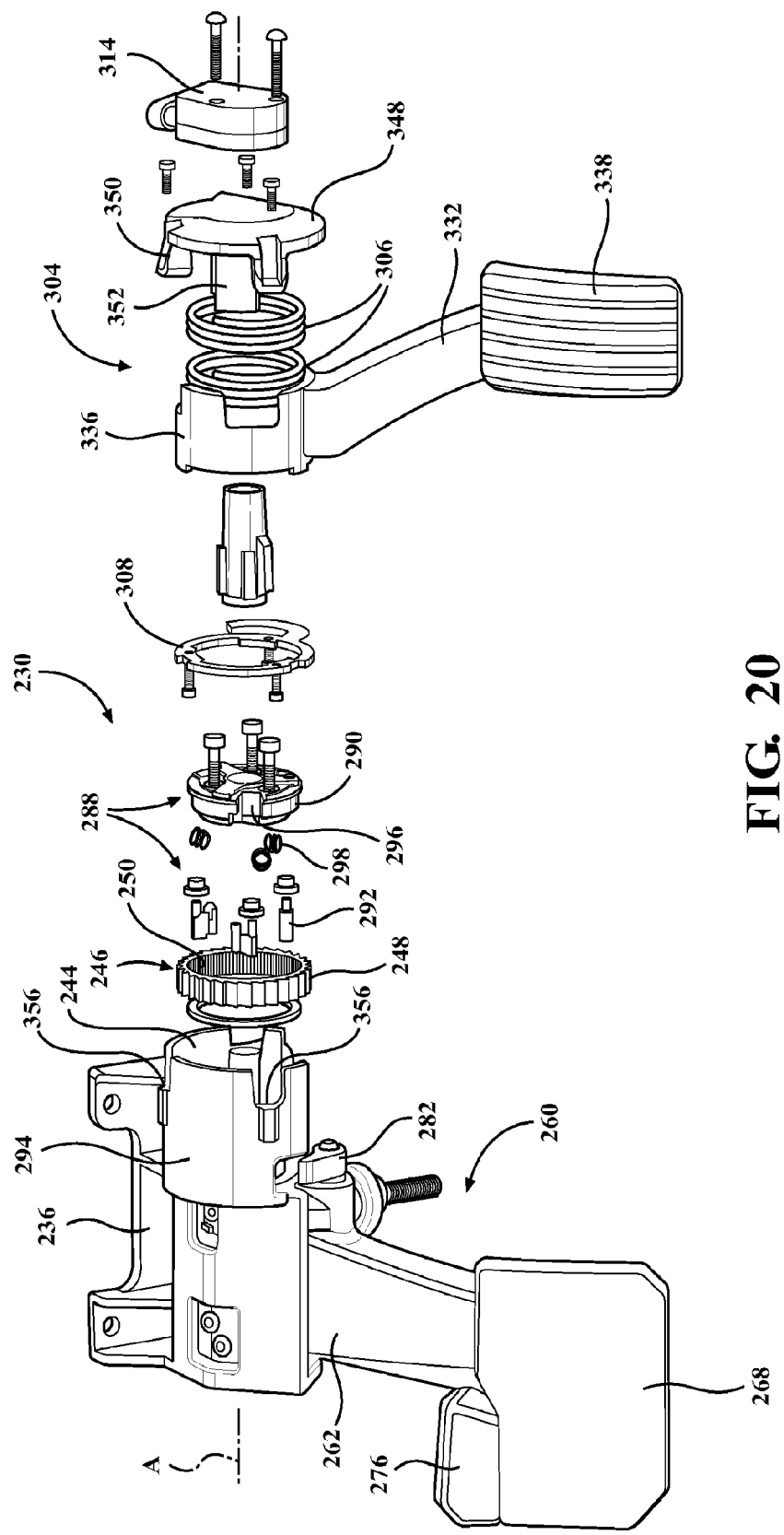
FIG. 20 is an exploded view of another alternative pedal apparatus.
Figure 21:
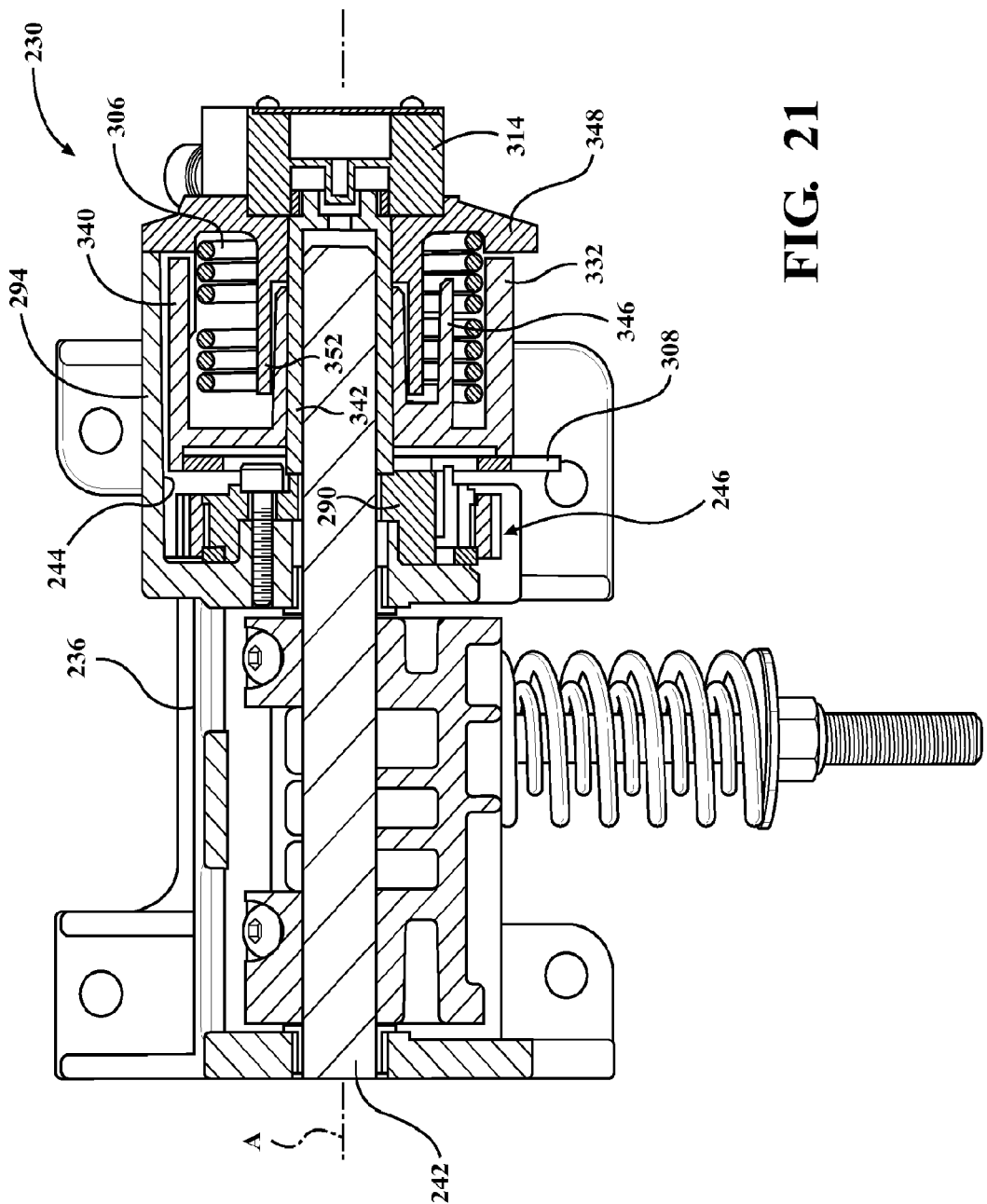
FIG. 21 is a plan rear view of the pedal apparatus of FIG. 20.
Figure 22:
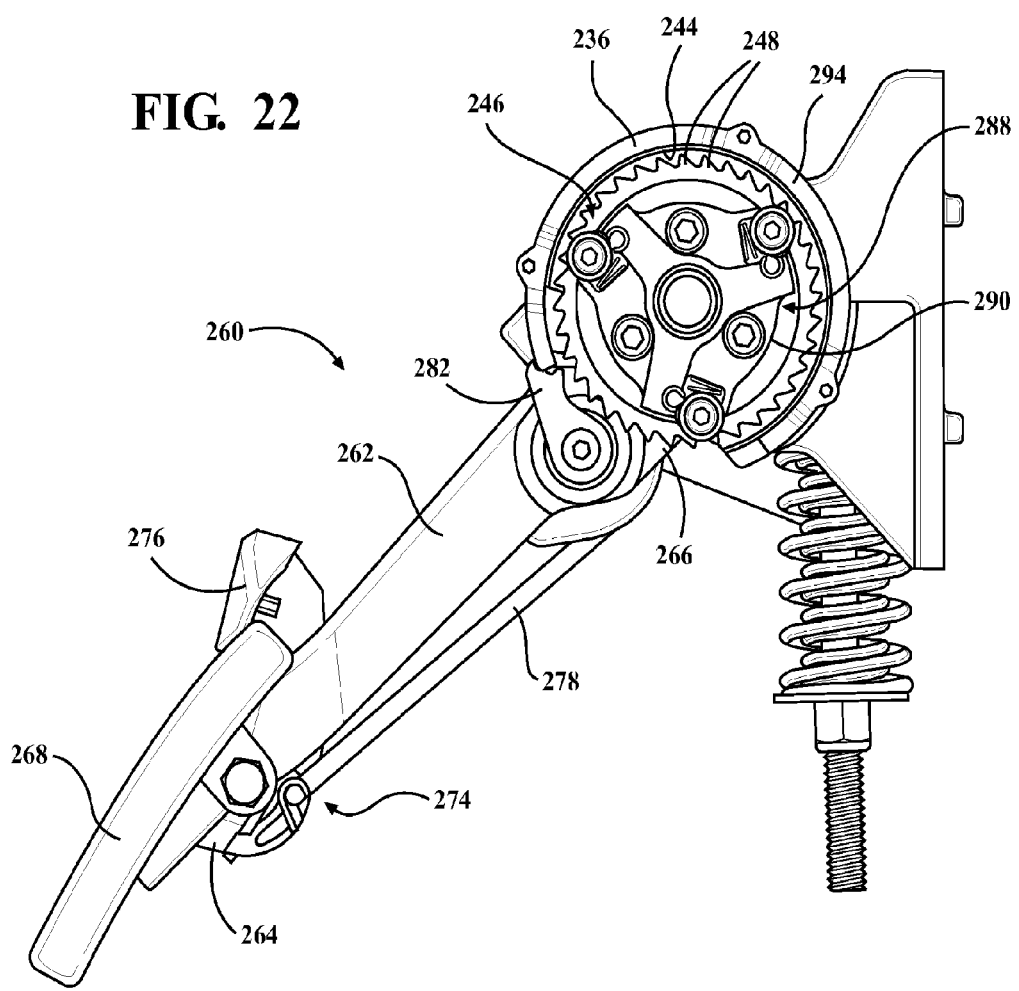
FIG. 22 is a side elevational view of a brake pedal assembly of the pedal apparatus of FIG. 20 with the brake pedal assembly in a first position, a latch in an unlocked position and disengaged from an intermediate device, and a retainer engaging the intermediate device.

Turing to the embodiment shown in FIGS. 20-30, wherein like numerals increased by 200 indicate like or corresponding parts throughout the several views, a pedal apparatus 230 for a vehicle is generally shown in FIGS. 20 and 21. As with the embodiments above, the vehicle includes a prime mover and a braking mechanism.

Figures 25, 26:
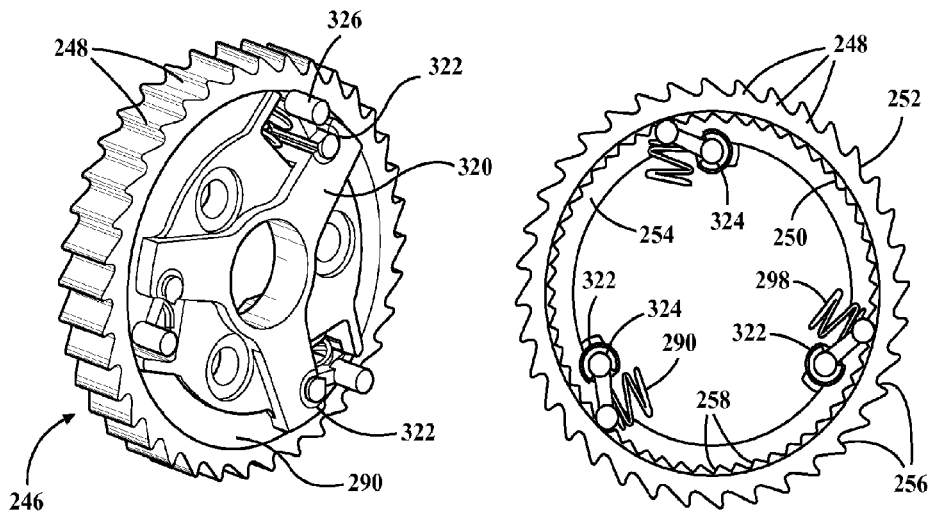
FIG. 25 is a perspective view of the retainer and intermediate device of the pedal apparatus of FIG. 20.
FIG. 26 is a plan view of the retainer and intermediate device of the pedal apparatus of FIG. 20.
Figure 27:
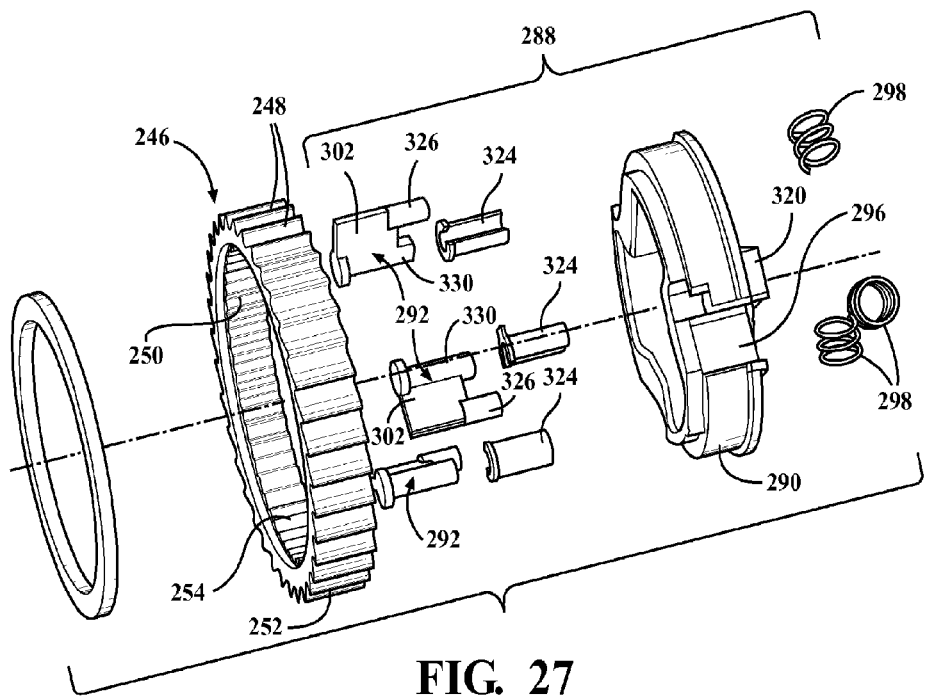
FIG. 27 is an exploded view of the retainer and the intermediate device of the pedal apparatus of FIG. 20.

The pedal apparatus 230 includes a support 236 defining an axis A and a shaft 242. The support 236 has a flange 294 defining an interior 244. A number of mounting areas 356 are provided on the flange 294. As shown, the mounting areas 356 include a notch and a boss, the purpose of which will be described in greater detail below. The shaft 242 extends through the support 236 along the axis A. The pedal apparatus 230 includes an intermediate device 246 disposed about the axis A. The intermediate device 246 has a plurality of first and second teeth 248, 250, as shown in FIGS. 20 and 26-27.

The intermediate device 246 may have an annular configuration with the intermediate device 246 concentrically disposed about the axis A. However, it is to be appreciated that the intermediate device 246 may have any configuration disposed about the axis A. The intermediate device 246 is capable of rotating about the axis A.

The intermediate device 246 may have an external surface 252 substantially facing the support 236 and an internal surface 254 substantially facing the shaft 242. Said differently, the external surface 252 of the annularly configured intermediate device 246 is disposed proximate the support 236 while the internal surface 254 of the annularly configured intermediate device 246 is disposed proximate the shaft 242. In this embodiment, the external and internal surfaces 252, 254 directly oppose each other radially relative to the axis A.

In one embodiment, the first teeth 248 are disposed along the external surface 252 and extend toward the support 236, and the second teeth 250 are disposed along the internal surface 254 and extend toward the shaft 242. The first and second teeth 248, 250 of the intermediate device 246 may have opposing configurations. More specifically, the first teeth 248 extends generally radial away from the axis A. Furthermore, the first teeth 248 are angled away from the general radial configuration. The second teeth 250 also extend generally radial toward the axis A. The second teeth 250 are also angled away from the general radial configuration. However, the second teeth 250 are angled opposite the first teeth 248. Said differently, the angle of the first and second teeth 248, 250 from the generally radial configuration is opposite one another. In this embodiment, the first and second teeth 248, 250 extend in opposite directions radially relative to the axis A.

Figure 23:
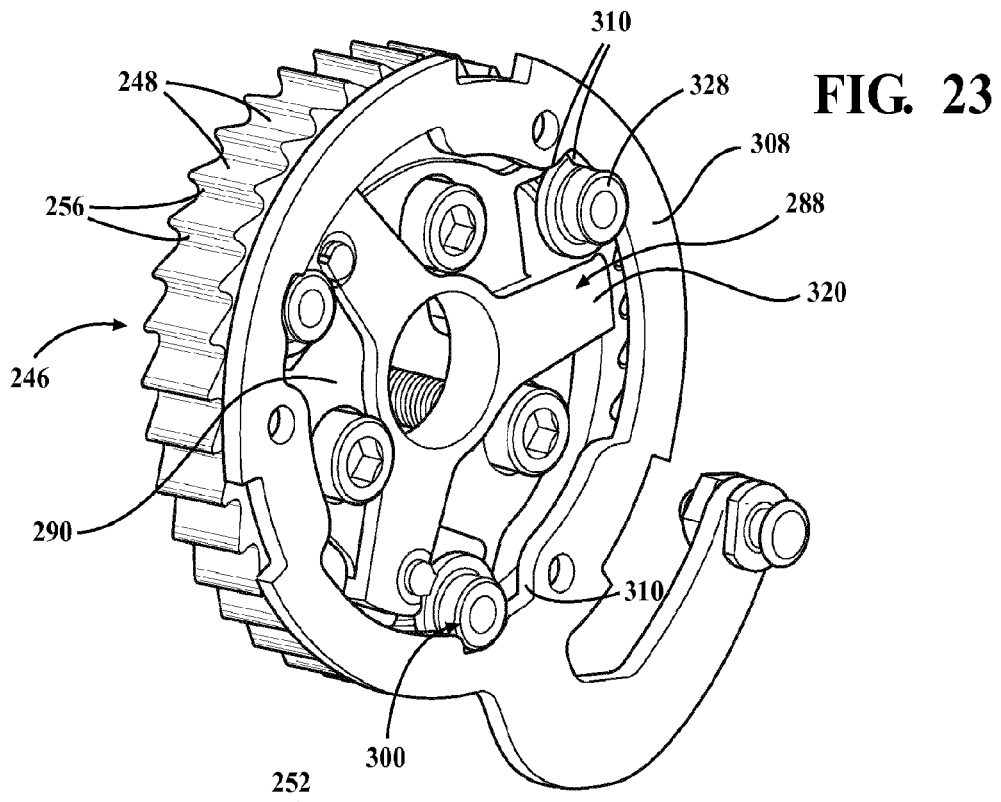
FIG. 23 is a perspective view of the retainer, intermediate device and an extension of the pedal apparatus of FIG. 20.
Figure 24:
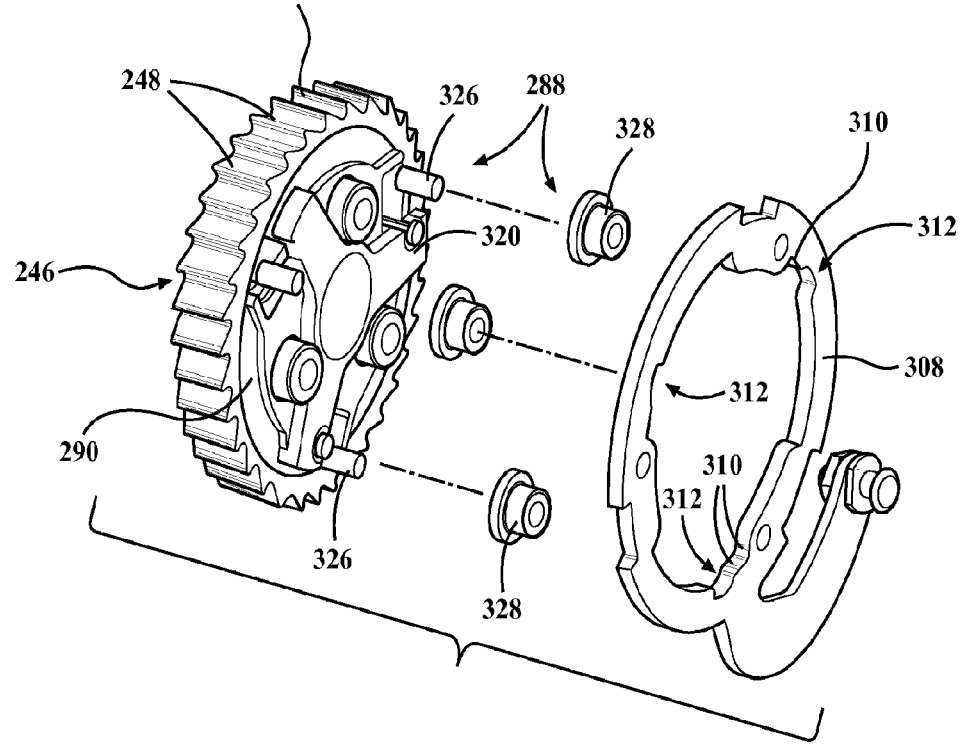
FIG. 24 is an exploded perspective view of the retainer, intermediate device and the extension of the pedal apparatus of FIG. 20.

As best shown in FIGS. 23 and 26, each of the first teeth 248 includes an engagement surface 256. The engagement surface 256 is angled inward such that the engagement surface 256 at least partially faces the axis A. Each of the second teeth 250 includes a contact surface 258. The contact surface 258 is disposed substantially radial to the axis A. Each radially adjacent engagement surface 256 and contact surface 258 are disposed substantially facing away from each other.

The pedal apparatus 230 includes a brake pedal assembly 260 movable about the axis A between a first position and a second position for operating the braking mechanism. The braking mechanism is activated when the brake pedal assembly 260 is in the second position. As will be described below, the brake pedal assembly 260 has a locked condition preventing movement out of the second position for continuously actuating the braking mechanism. The brake pedal assembly 260 engages the intermediate device 246 when in the locked condition.

The brake pedal assembly 260 may include a brake pedal arm 262 having a first end 264 and a second end 266 and a brake pedal pad 268 coupled to the brake pedal arm 262 at the first end 264 with the brake pedal arm 262 pivotable about the axis A at the second end 266 as the brake pedal assembly 260 moves between the first and second positions. The second end 266 of the brake pedal arm 262 is mounted to and movable with the shaft 242 to facilitate movement of the brake pedal assembly 260 between the first and second positions. The movement of the brake pedal assembly 260 about the axis A is further defined as pivoting about the axis A with the shaft 242 as the shaft 242 rotates about the axis A. However, it is to be appreciated that the brake pedal may rotate relative to the shaft 242.

The brake pedal assembly 260 may include a park brake actuator 274. The park brake actuator 274 is coupled to the brake pedal arm 262 and is movable relative to the brake pedal arm 262. The park brake actuator 274 has a park brake pad 276 and a plurality of links 278 with the park brake pad 276 disposed adjacent the brake pedal pad 268 and the links 278 coupled to the park brake pad 276 and extending along the brake pedal arm 262 toward the second end 266. Movement of the park brake actuator 274 is further defined as pivoting of the park brake pad 276 and corresponding movement of the links 278.

The pedal apparatus 230 includes a latch 282 movable between unlocked and locked positions independent of the movement of the brake pedal assembly 260 between the first and second positions. The latch 282 is engageable with at least one of the first teeth 248 when in the locked position to couple the brake pedal assembly 260 to the intermediate device 246.

The movement of the latch 282 between the unlocked and locked positions may be further defined as pivoting of the latch 282 between the unlocked and locked positions. The park brake actuator 274 is coupled to each of the latch 282 and the brake pedal arm 262 with the park brake actuator 274 movable relative to the brake pedal arm 262 to move the latch 282 between the unlocked and locked positions. Specifically, the latch 282 is pivotably coupled to the brake pedal arm 262 at the second end 266 and is coupled to the links 278 of the park brake actuator 274. The pivoting of the park brake pedal and corresponding movement of the links 278 facilitates pivoting of the latch 282. Specifically, the latch 282 is normally disposed in the unlocked position. Pivoting of the park brake pedal toward the brake pedal arm 262 results in pivoting of the latch 282 toward the locked position. The latch 282 may be continuously biased away from the first teeth 248.

As described above, the intermediate device 246 is capable of rotating about the axis A. As will be described below, the intermediate device 246 is selectively retained to prevent rotation of the intermediate device 246 when the latch 282 engages the first teeth 248. In particular, the brake pedal assembly engages the intermediate device 246 when in a locked condition.

The pedal apparatus 230 includes a retainer 288 disposed about the axis A. The retainer 288 is disposed about the shaft 242 and the axis A. The retainer 288 is disposed within an interior 244 of the support 236. The retainer 288 may have a circular configuration concentrically disposed about the axis A. Said differently, the retainer 288 extends radially from the shaft 242. It is to be appreciated that the retainer 288 may have any configuration disposed about the axis A. The shaft 242 is rotatable relative to the retainer 288.

The retainer 288 is disposed between the shaft 242 and the intermediate device 246. The intermediate device 246 is concentrically disposed about at least a portion of the retainer 288. More specifically, the intermediate device 246, having the annular configuration, is concentrically disposed about the axis A and surrounds at least a portion of the retainer 288. Said differently, the retainer 288 is aligned along axis A with a portion of the retainer 288 disposed radially between the shaft 242 and the intermediate device 246.

The retainer 288 has a hub 290 mounted to the support 236 and at least one actuating device 292. More specifically, the support 236 has a flange 294 extending toward the shaft 242 as best shown in FIG. 21. The hub 290 is mounted to the flange 294 by a plurality of fasteners. It is to be appreciated that the hub 290 may be mounted to the flange 294 by any suitable means.

The hub 290 defines a perimeter radially spaced from the axis A. The at least one actuating device 292 is disposed along the perimeter of the hub 290. The at least one actuating device 292 selectively engages the intermediate device 246 to couple the intermediate device 246 to the retainer 288 for retaining the brake pedal assembly 260 in the locked condition. The at least one actuating device 292 selectively engages at least one of the second teeth 250 of the intermediate device 246 to couple the intermediate device 246 to the retainer 288 and the support 236 for retaining the latch 282 in the locked position and the brake pedal assembly 260 in the second position.

The at least one actuating device 292 is shown as three actuating devices 292 spaced from each other about perimeter of the hub 290. It is to be appreciated that the actuating device 292 may be any number of actuating devices 292.

The actuating device 292 may be pivotably coupled to the hub 290 to facilitate selective engagement of the actuating device 292 with the second teeth 250 of the intermediate device 246. The hub 290 may define at least one cavity 296 with the actuating device 292 at least partially disposed within the cavity 296 and pivoting within the cavity 296 away from the second teeth 250 of the intermediate device 246 to disengage the actuating device 292 from the second teeth 250. Said differently, the hub 290 defines the at least one cavity 296 along the perimeter of the hub 290. In the embodiment of FIGS. 20-30, the cavities 296 of the hub 290 are notches integrally formed along the perimeter of the hub 290. The hub 290 also includes a raised portion 320 having a second cavity 322 for receiving a portion of the actuating device 292. As shown best in FIGS. 26 and 27, the hub 290 includes a bearing device 324 disposed within each of the second cavities 322 for receiving the portion of the actuating device 292.

The actuating device 292 may be biased away from the axis A to selectively engage at least one of the second teeth 250 of the intermediate device 246. The retainer 288 includes a biasing device 298 disposed within each of the at least one cavity 296 with the biasing device 298 abutting each of the hub 290 and the actuating device 292 to bias the actuating device 292 away from the axis A and toward the second teeth 250 of the intermediate device 246.

The actuating device 292 may have a lobe 300 and a tab 302 spaced from each other with the tab 302 selectively engaging the second teeth 250. The lobe 300 is disposed adjacent to the intermediate device 246 along the axis A. The lobe 300 radially extends past the first teeth 248 of the intermediate device 246 toward the support 236. In the embodiment of FIGS. 20-30, the lobe 300 is formed of two components, namely a post 326 and a bushing 328 disposed on the post 326. As best shown in FIGS. 23-27, the post 326 extends from the tab 302 and the bushing 328 is disposed on the post 326 with both the post 326 and bushing 328 extending outward from the retainer 288 and the bushing 328 extending radially past the first teeth 248. The actuating device 292 of this embodiment also includes a support portion 330 engaging the bearing device 324 for supporting the actuating device 292 in the hub 290. The support portion 330 is mounted to the tab 302 at a position opposite from the post 326 such that the tab 302 and post 326 are free to pivot relative to the bearing device 324 and hub 290.

The tab 302 of the actuating device 292 extends substantially parallel to the axis A. The tab 302 is configured to abut the contact surface 258 of the second teeth 250 of the intermediate device 246. The tab 302 is continuously biased toward the second teeth 250. More specifically, the biasing device 298 continuously biases the tab 302 toward the second teeth 250. The latch 282 pivots into engagement with the at least one of the first teeth 248 in the locked position and the tab 302 of the actuating device 292 selectively pivots into engagement with the second teeth 250.

As described above, the first and second teeth 248, 250 of the intermediate device 246 may have opposing configurations. The engagement of the latch 282 with the first teeth 248 opposes the engagement of the actuating device 292 with the second teeth 250 to prevent rotation of the intermediate device 246 about the axis A. The retainer 288, which is mounted to the support 236, retains the intermediate device 246 and the intermediate device 246 retains the latch 282 which is coupled to the brake pedal assembly 260.

The pedal apparatus 230 also includes an accelerator pedal assembly 304. As discussed above relative to the other embodiments, the accelerator pedal assembly 304 can selectively disconnect the brake pedal assembly 260 from retainment to the support 236 in the second position, which allows the brake pedal assembly 260 to pivot to the first position and deactivate the braking mechanism.

The accelerator pedal assembly 304 is movable about the axis A between an initial position and a displaced position for operating the prime mover. The movement of the accelerator pedal about the axis A is further defined as pivoting of the accelerator pedal about the axis A. The pedal apparatus 230 further includes a biasing member 306 coupled to and biasing the accelerator pedal assembly 304 toward the initial position, which is described in greater detail below.

The shaft 242 may couple the brake and accelerator pedal assemblies to the support 236. More specifically, the accelerator pedal assembly 304 is movable about and relative to the shaft 242 to facilitate the movement of the accelerator pedal assembly 304 independent of the movement of the brake pedal assembly 260 with the shaft 242.

The accelerator pedal assembly 304 engages the lobe 300 to correspondingly move the tab 302 out of engagement with the second teeth 250 of the intermediate device 246. In the embodiment shown in FIGS. 20-30, the accelerator pedal assembly 304 engages the bushing 328 of the lobe 300. More specifically, the accelerator pedal assembly 304 may include an extension 308 having an abutment surface 310. The extension 308 is concentrically disposed about at least a portion of the retainer 290. As shown, the intermediate device is concentrically disposed about the hub and the extension 308 is concentrically disposed about a portion of the actuating device. In this embodiment, the extension 308 is disposed axially adjacent to the intermediate device 246 about the lobes 300 of the actuating device 292. As shown, the extension 308 can have an annular configuration with the extension 308 concentrically disposed about the axis A and the retainer 290. The abutment surface 310 is disposed within the annularly configured extension 308 and substantially faces the axis A. The extension 308 is radially disposed about the axis A and extends longitudinally along the axis A toward the brake pedal assembly 260. The concentric disposition of the retainer 288, the intermediate device 246, and the extension 308 about the axis A makes the pedal apparatus compact, which takes up less volume in the vehicle.

The extension 308 selectively engages the actuating device 292 to disengage the actuating device 292 from the intermediate device 246 and release the brake pedal assembly 260 from the locked condition. The extension 308 selectively engages the actuating device 292 as the accelerator pedal assembly 304 moves between the initial and displaced positions to disengage the actuating device 292 from the second teeth 250 of the intermediate device 246. More specifically, the abutment surface 310 selectively engages the actuating device 292 as the accelerator pedal assembly 304 moves between the initial and displaced positions. As described above, the lobe 300 of the actuating device 292 is disposed adjacent to the intermediate device 246 along the axis A and the lobe 300 also extends toward the extension 308.

The extension 308 defines at least one channel 312 with the channel 312 at least partially defined by the abutment surface 310. The channel 312 extends along the extension 308 substantially parallel to the axis A. The lobe 300 of the actuating device 292 extends into the channel 312 spaced from the abutment surface 310. Specifically in this embodiment, the bushing 328 of the lobe 300 extends into and abuts the channel 312. As described above, in the example shown the at least one actuating device 292 is further defined as three actuating devices 292 spaced from each other about the perimeter of the hub 290. Likewise, the at least one channel 312 is further defined as three channels 312 spaced from each other about the hub 290. It is to be appreciated that the channels 312 may be any number of channels 312. The channels 312 are configured such that each lobe 300 individually extends into the channels 312, concurrently. Said differently, each lobe 300 of the actuating devices 292 is concurrently selectively disposed within the respective channel 312 of each lobe 300. The channels 312 are configured such that the lobes 300 are disposed within the channels 312 when the accelerator pedal assembly 304 is in the initial position. With the lobe 300 disposed in the channel 312, the tab 302 of the actuating device 292 engages the second teeth 250 of the intermediate device 246 when the accelerator pedal assembly 304 is in the initial position.

As the accelerator pedal assembly 304 pivots about the axis A from the initial position to the displaced position, the extension 308 rotates as well about the axis A. The rotation of the extension 308 about the axis A causes the channels 312 to move relative to the lobe 300 of the actuating devices 292. The rotation of the extension 308 results in the abutment surface 310 engaging the lobe 300. Specifically in this embodiment, the abutment surface 310 engages the bushing 328 of the lobe 300. The selective engagement of the abutment surface 310 with the actuating device 292 disengages the actuating device 292 from the second teeth 250 of the intermediate device 246. The actuating devices 292 pivot against the bias of the biasing devices 298 away from the second teeth 250. The disengagement of the actuating devices 292 from the second teeth 250 releases the latch 282 from engagement with the first teeth 248 of the intermediate device 246. More specifically, with the actuating devices 292 disengaged from the second teeth 250, the intermediate device 246 is disengaged from the support 236. The intermediate device 246 is allowed to freely rotate about the axis A.

The bias of the latch 282 toward the unlocked position facilitates disengagement of the latch 282 from the exterior teeth of the intermediate device 246 when the actuating device 292 disengages from the second teeth 250 of the intermediate device 246.

The pedal apparatus 230 may further include a sensor 314 coupled to the accelerator pedal assembly 304 and transmitting a second signal for operating the prime mover in a similar manner as described above.

Turning to FIGS. 20-21 and 28-30, the particular configuration of the accelerator pedal assembly 304 will be discussed in greater detail. The accelerator pedal assembly 304 of this embodiment is self contained and can be easily pre-loaded as will be discussed. Further, the accelerator pedal assembly 304 can be pre-assembled and easily mounted about the shaft 242 and the support 236 as a single unit.

The accelerator pedal assembly 304 includes an accelerator pedal arm 332 having a first end 334 and a second end 336. An accelerator pedal pad 338 is coupled to the accelerator pedal arm 332 at the first end 334 with the accelerator pedal arm 332 pivotable about the axis A at the second end 336 as the accelerator pedal assembly 304 moves between the initial and displaced positions. As shown in FIG. 21, the second end 336 of the accelerator pedal arm 332 extends into the interior 244 of the flange 294 of the support 236. In particular, the interior 244 of the support 236 can act as a bearing surface against an exterior surface of the second end 336 of the accelerator pedal arm 332. The movement of the accelerator pedal assembly 304 about the axis A is further defined as pivoting about the axis A and the shaft 242.

Figure 28:
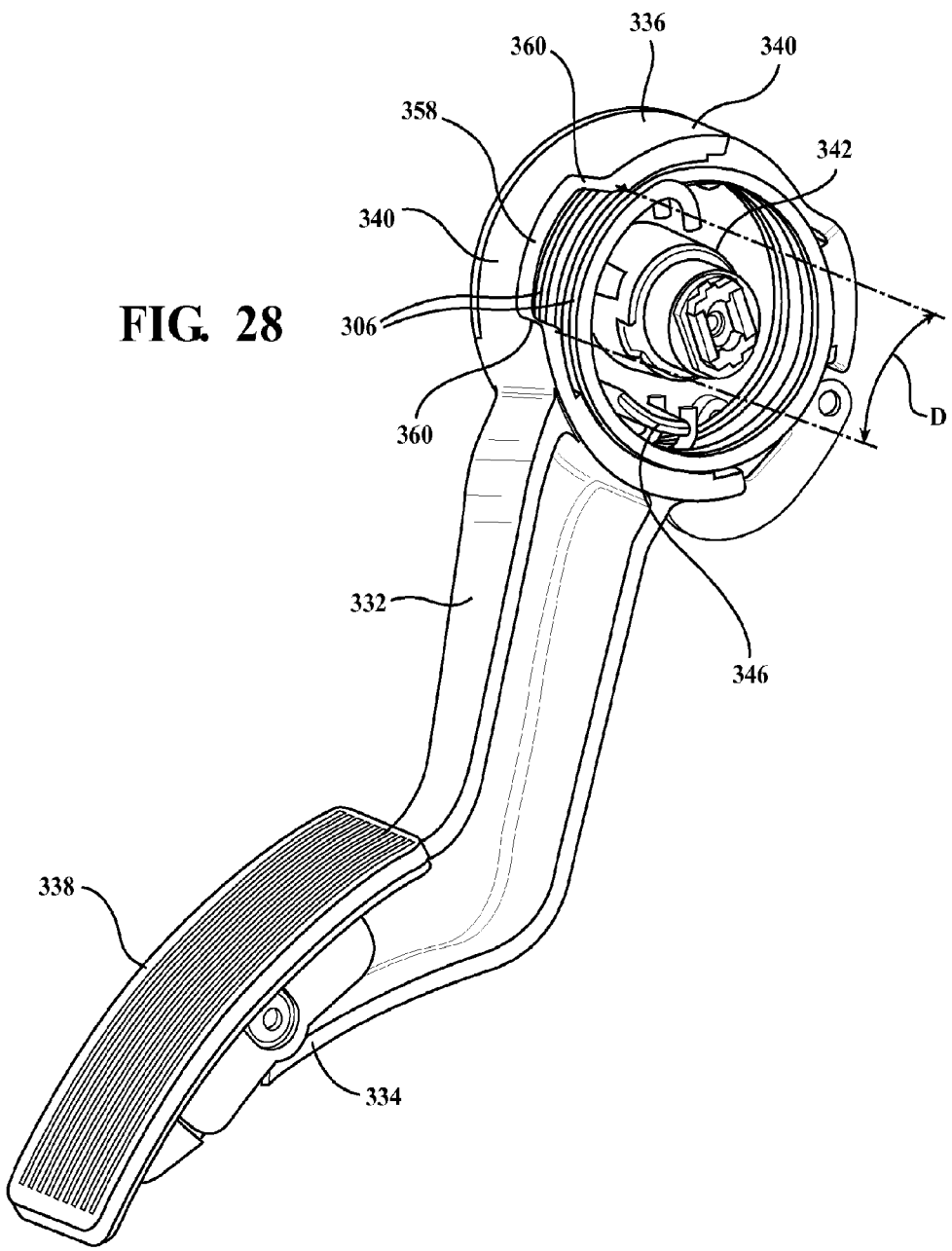
FIG. 28 is a perspective view of an accelerator pedal assembly and a pair of coil springs of the pedal apparatus of FIG. 20.
Figure 29:
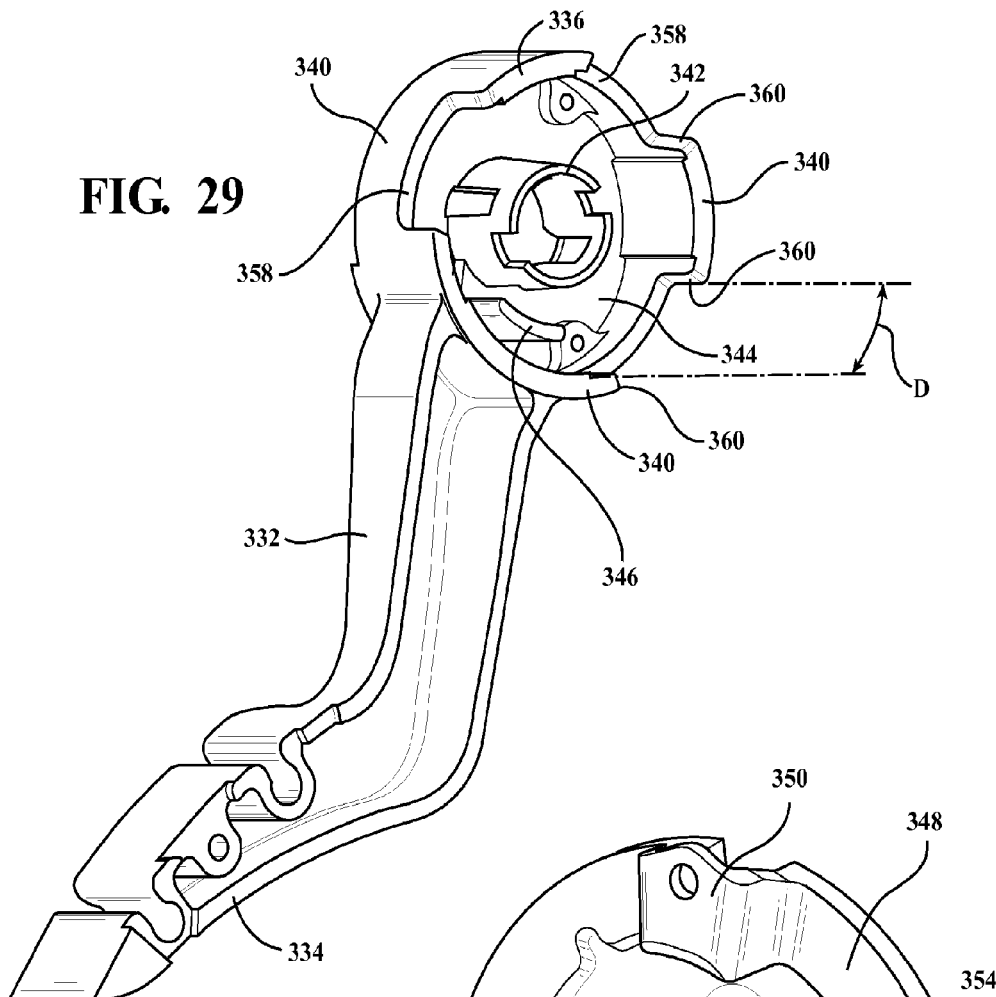
FIG. 29 is a perspective view of the accelerator pedal assembly of the pedal apparatus of FIG. 20.

As best shown in FIGS. 20-21 and 28-29, the second end 336 of the accelerator pedal arm 332 has peripheral walls 340 and a first internal radial flange 342 defining an inner cavity 344. The peripheral walls 340 have distal ends and define at least one notch 358 having opposing stops 360. As shown in FIGS. 28 and 29, the opposing stops 360 define a radial distance D, which is the degree of radial movement of the accelerator pedal arm. A first abutment 346 projects into the inner cavity 344. When assembled, the shaft 242 passes at least partially through the first internal radial flange 342.

A biasing member 306 is coupled to and biases the accelerator pedal assembly 304 toward the initial position. The biasing member 306 is shown as a pair of biasing members 306, which is primarily done for redundancy/safety reasons. The biasing member 306 is shown as a coiled spring, but can be of any suitable configuration. The biasing member 306 has first and second ends that are configured in a different orientation than the remaining portions of the biasing member 306. As shown, the first and second ends are bent inward toward each other. As illustrated in FIG. 28, when installed within the second end 336, the first end of the biasing member 306 directly engages the first abutment 346. The biasing member 306 in this embodiment is entirely disposed within the inner cavity 344 of the accelerator pedal arm 332.

Figure 30:
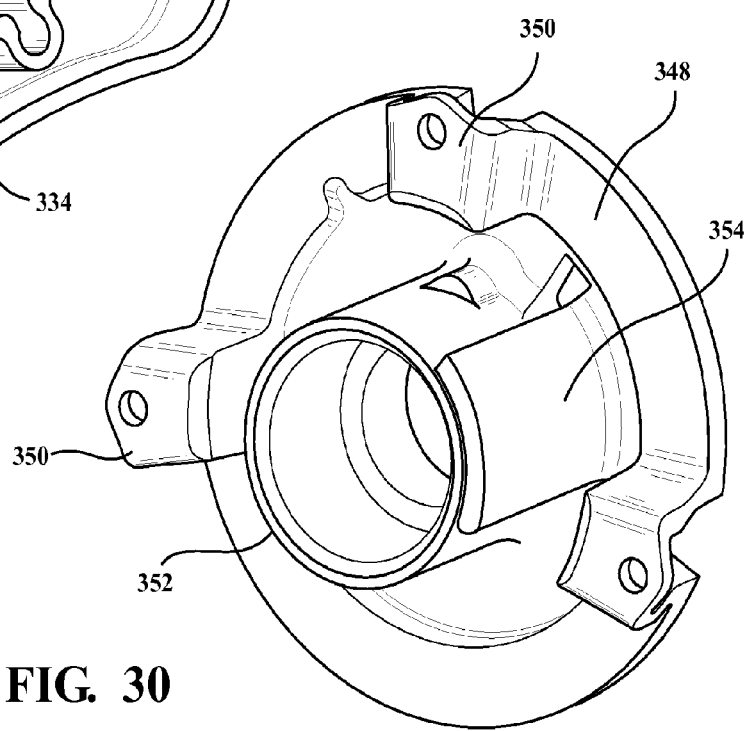
FIG. 30 is a perspective view of a cover for the accelerator pedal assembly of the pedal apparatus of FIG. 20.

As shown in FIGS. 20-21 and 30, a cover 348 is mounted about the second end 336 of the accelerator pedal arm 332 to close the inner cavity 344. The cover 348 includes a second internal radial flange 352. When assembled, the shaft 242 also passes at least partially through the second internal radial flange 352. The cover 348 further includes a second abutment 354. The second internal radial flange 352 and the second abutment 354 both project in a common direction and may be separate components from each other or may be, such as shown, integrated with each other. In other words, as shown, the second abutment 354 is an integral radial projection from the second internal radial flange 352. When installed, such as shown in FIG. 21, the first and second internal radial flanges 342, 352 mate with each other. Specifically, as shown, the first internal radial flange 342 is at least partially radially disposed within the second internal radial flange 352. The first internal radial flange 342 will rotate relative to the second internal radial flange 352 when the cover 348 is fixedly mounted to the support 236 and the accelerator pedal arm 332 is actuated. The cover 348 includes a number of mounting points 350 for securing the cover 348 to the mounting areas 356 of the flange 294 of the support 236 through the use of fasteners or any other suitable method.

The installation of the cover 348 onto the second end 336 of the accelerator pedal arm 332, and then the support 236, will now be addressed in greater detail. The cover 348 is brought into close proximity to the distal ends of the peripheral walls 340 with the second abutment 354 of the cover 348 aligning and directly engaging the second end of the biasing member 306. In this radial position, the mounting points 350 of the cover 348 are in contact with the distal ends of the walls 340. Rotation of the cover 348 is required to properly align the cover 348 with the second end 336 of the accelerator pedal arm 332 and to simultaneously align the mounting points 350 with the corresponding mounting areas 356 on the support 236. The cover 348 is therefore rotated until the mounting points 350 align and fall into corresponding notches 358. As mentioned above, the stops 360 within the notches 358 define the radial degree of movement of the accelerator pedal arm 332. This occurs because the stops 360 engage corresponding mounting points 350 to hold the accelerator pedal arm in the initial position and to also define the limits of the displaced position.

The simultaneous interengagement between the second abutment 354 and the second end of the biasing member 306, the continued engagement between the first abutment 346 and the first end of the biasing member 306, and the rotation of the cover 348 to align the mounting points 350 with the notches 358 automatically loads the biasing member 306 and the accelerator pedal arm 332 for proper operation. More specifically, the second abutment 354 pushes against and winds the second end of the biasing member 306 relative to the first end of the biasing member 306. In one embodiment, the first and second ends are substantially 180 degrees across from each other when in the loaded or wound position. In the orientation shown in FIG. 28, the rotation of the cover 348 during installation would be in a clockwise direction, which would in turn load the accelerator pedal arm 332 for continuous biasing movement in the clockwise direction toward the initial position. This sub-assembly of the loaded accelerator pedal arm does not require any fasteners and is held into position by the continuous biasing force of the mounting points 350 against the stops 360. The accelerator pedal arm sub-assembly can then be efficiently mounted onto the support 236.

In particular, the mounting points 350 on the cover 348 are fixedly mounted to the mounting areas 356 of the flange 294 of the support 236. As is appreciated, the notches and bosses of the mounting areas 356 are complementary in configuration to the mounting points 350 such that the accelerator pedal arm sub-assembly can be efficiently mounted. As the accelerator pedal arm 332 is actuated from the initial position to the displaced position, the accelerator pedal arm 332 would rotate in a counter-clockwise direction (relative to the orientation in FIG. 28), which would also rotate the first abutment 346 against the first end of the biasing member 306 in a counter-clockwise direction. The cover 348 and second abutment 354 are fixed relative to the support 236 such that this counter-clockwise rotation would further load the biasing member 306 within the inner cavity 344.

The operation of activating the braking mechanism and maintaining the vehicle in the parked state along with the operation of releasing the vehicle from the parked state are substantially the same as described above and will therefore not be repeated.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A pedal apparatus for a vehicle with the vehicle having a prime mover and a braking mechanism, said pedal apparatus comprising:
    a support defining an axis;
    a brake pedal assembly movable about said axis between a first position and a second position for operating the braking mechanism and including a latch movable between unlocked and locked positions independent of said movement of said brake pedal assembly between said first and second positions;
    an accelerator pedal assembly movable about said axis between an initial position and a displaced position for operating the prime mover;
    an intermediate device disposed about said axis and having a plurality of first and second teeth with said latch engageable with at least one of said first teeth when in said locked position to couple said brake pedal assembly to said intermediate device; and
    a retainer disposed about said axis with said retainer having a hub mounted to said support and at least one actuating device to selectively engage at least one of said second teeth of said intermediate device to couple said intermediate device to said retainer and said support for retaining said latch in said locked position and said brake pedal assembly in said second position.

2. A pedal apparatus as set forth in claim 1 wherein said actuating device is pivotably coupled to said hub to facilitate selective engagement of said actuating device with said second teeth of said intermediate device.

3. A pedal apparatus as set forth in claim 2 wherein said hub defines at least one cavity with said actuating device at least partially disposed within said cavity, and pivoting within said cavity away from said second teeth of said intermediate device to disengage said actuating device from said second teeth.

4. A pedal apparatus as set forth in claim 1 wherein said actuating device has a lobe and a tab spaced from each other with said tab selectively engaging said second teeth, and said accelerator pedal assembly engaging said lobe to correspondingly move said tab out of engagement with said second teeth of said intermediate device.

5. A pedal apparatus as set forth in claim 4 wherein said accelerator pedal assembly includes an extension having an abutment surface with said extension defining at least one channel with said channel at least partially defined by said abutment surface, said lobe of said actuating device extending into said channel spaced from said abutment surface and said tab of said actuating device engaging said second teeth of said intermediate device when said accelerator pedal assembly is in said initial position.

6. A pedal apparatus as set forth in claim 1 wherein said accelerator pedal assembly includes an extension having an abutment surface selectively engaging said actuating device as said accelerator pedal assembly moves between said initial and displaced positions for disengaging said actuating device from said second teeth of said intermediate device to release said latch from engagement with said first teeth of said intermediate device.

7. A pedal apparatus as set forth in claim 1 wherein said intermediate device has an annular configuration with said intermediate device concentrically disposed about said axis.

8. A pedal apparatus as set forth in claim 7 wherein said retainer is concentrically disposed about said axis with said intermediate device concentrically disposed about at least a portion of said retainer.

9. A pedal apparatus as set forth in claim 8 wherein said accelerator pedal assembly includes an extension having an annular configuration with said extension concentrically disposed about said axis and at least a portion of said retainer with said extension selectively engaging said actuating device as said accelerator pedal assembly moves between said initial and displaced positions to disengage said actuating device from said second teeth of said intermediate device.

10. A pedal apparatus as set forth in claim 1 wherein said first and second teeth have opposing configurations with said engagement of said latch with said first teeth opposing said engagement of said actuating device with said second teeth to prevent rotation of said intermediate device about said axis.

11. A pedal apparatus as set forth in claim 10 wherein said movement of said latch between said unlocked and locked positions is further defined as pivoting of said latch between said unlocked and locked positions, with said latch pivoting into engagement with said at least one of said first teeth in said locked position and said actuating device having a tab with said tab selectively pivoting into engagement with said second teeth.

12. A pedal apparatus as set forth in claim 11 wherein said latch is continuously biased away from said first teeth and said tab is continuously biased toward said second teeth.

13. A pedal apparatus as set forth in claim 1 wherein said latch is biased toward said unlocked position to facilitate disengagement of said latch from said exterior teeth of said intermediate device when said actuating device disengages from said second teeth of said intermediate device.

14. A pedal apparatus as set forth in claim 1 wherein said latch engages said first teeth and said actuating device engages said second teeth concurrently to facilitate coupling of said brake pedal assembly to said support and retain said brake pedal assembly in said second position.

15. A pedal apparatus as set forth in claim 1 further including a first biasing member coupled to and biasing said brake pedal assembly toward said first position with said bias of said first biasing member facilitating engagement of said latch with said first teeth of said intermediate device for retaining said latch in said locked position and said brake pedal in said second position.

16. A pedal apparatus as set forth in claim 1 wherein said brake pedal assembly includes a brake pedal arm having a first end and a second end and a park brake actuator coupled to each of said latch and said brake pedal arm with said park brake actuator movable relative to said brake pedal arm to move said latch between said unlocked and locked positions.

17. A pedal apparatus for a vehicle with the vehicle having a prime mover and a braking mechanism, said pedal apparatus comprising:
a shaft defining an axis;
a brake pedal assembly movable about said axis between a first position and a second position for operating the braking mechanism with said brake pedal assembly having a locked condition preventing movement out of said second position for continuously actuating the braking mechanism;
an accelerator pedal assembly movable about said axis between an initial position and a displaced position for operating the prime mover;
an intermediate device disposed about said axis with said brake pedal assembly engaging said intermediate device when in said locked condition; and
a retainer disposed about said shaft and said axis with said intermediate device concentrically disposed about at least a portion of said retainer, and said retainer having at least one actuating device selectively engaging said intermediate device to couple said intermediate device to said retainer for retaining said brake pedal assembly in said locked condition.

18. A pedal apparatus as set forth in claim 17 wherein said accelerator pedal assembly includes an extension concentrically disposed about at least a portion of said retainer with said extension selectively engaging said actuating device to disengage said actuating device from said intermediate device to release said brake pedal assembly from said locked condition.

19. A pedal apparatus as set forth in claim 18 wherein said retainer has a hub with said intermediate device concentrically disposed about said hub, and said extension concentrically disposed about a portion of said actuating device.

20. A pedal apparatus as set forth in claim 17 wherein said actuating device has a lobe and a tab spaced from each other with said tab selectively engaging said intermediate device, and said accelerator pedal assembly engaging said lobe to correspondingly move said tab out of engagement with said intermediate device.

21. A pedal apparatus as set forth in claim 20 wherein said accelerator pedal assembly includes an extension having an abutment surface with said extension defining at least one channel with said channel at least partially defined by said abutment surface, said lobe of said actuating device extending into said channel spaced from said abutment surface and said tab of said actuating device engaging said intermediate device when said accelerator pedal assembly is in said initial position.

* * * * *